(12) United States Patent
Tauchi et al.

(10) Patent No.: US 9,656,722 B2
(45) Date of Patent: May 23, 2017

(54) BICYCLE CONTROL APPARATUS

(71) Applicant: Shimano Inc., Sakai, Osaka (JP)

(72) Inventors: Mitsuru Tauchi, Osaka (JP); Takashi Toyoshima, Osaka (JP); Jun Gao, Osaka (JP)

(73) Assignee: Shimano Inc., Osaka (JP)

( * ) Notice: Subject to any disclaimer, the term of this patent is extended or adjusted under 35 U.S.C. 154(b) by 174 days.

(21) Appl. No.: 14/505,945

(22) Filed: Oct. 3, 2014

(65) Prior Publication Data

US 2015/0120119 A1    Apr. 30, 2015

(30) Foreign Application Priority Data

Oct. 29, 2013   (JP) ................................ 2013-224121
Aug. 20, 2014   (JP) ................................ 2014-167488

(51) Int. Cl.
| | | |
|---|---|---|
| B62M 1/36 | (2013.01) | |
| B62M 6/50 | (2010.01) | |
| B60L 15/30 | (2006.01) | |
| B62K 11/00 | (2006.01) | |
| B62M 6/45 | (2010.01) | |
| B62M 15/00 | (2006.01) | |
| B62M 25/08 | (2006.01) | |
| B62M 6/55 | (2010.01) | |

(52) U.S. Cl.
CPC ................ B62M 6/45 (2013.01); B62M 6/55 (2013.01); B62M 15/00 (2013.01); B62M 25/08 (2013.01); B62K 11/00 (2013.01)

(58) Field of Classification Search
CPC .... B60W 20/00; B60W 10/26; B60W 10/115; B60W 2510/083; B60W 2710/242; B60L 2240/547; B60L 3/0046; B60L 7/12; B60L 7/16; B60Y 2300/188; Y02T 10/70; B62M 1/36; G01C 21/3423; B62K 5/007; H02P 6/08
See application file for complete search history.

(56) References Cited

U.S. PATENT DOCUMENTS 5,845,727 A * 12/1998 Miyazawa ............... B62M 6/55
                                                   180/206.4
6,047,230 A    4/2000 Spencer et al.
(Continued)

FOREIGN PATENT DOCUMENTS

CN           1646361 A      7/2005
JP        10-194185 A      7/1998
(Continued)

Primary Examiner — Thomas G Black
Assistant Examiner — Demetra Smith-Stewart
(74) Attorney, Agent, or Firm — Global IP Counselors, LLP

(57) ABSTRACT

A bicycle control apparatus is basically provided with a manual drive force detecting device, a rotation state detection device and a controller. The manual drive force detecting device detects a manual drive force. The rotation state detection device detects a parameter relating to crankshaft rotation of a crankshaft. The controller is programmed to control at least one of a driving unit that generates an auxiliary drive force and an electric transmission unit so that the manual drive force and the parameter relating to the crankshaft rotation will be within a prescribed range.

28 Claims, 19 Drawing Sheets

(56) References Cited

U.S. PATENT DOCUMENTS

| | | | | |
|---|---|---|---|---|
| 6,073,717 | A * | 6/2000 | Yamamoto | B62M 6/55 180/206.4 |
| 6,320,336 | B1 * | 11/2001 | Eguchi | B62M 6/45 180/206.2 |
| 8,958,935 | B2 * | 2/2015 | Shoge | B62M 6/45 701/22 |
| 9,302,734 | B2 * | 4/2016 | Getta | B62M 6/55 |
| 2012/0226400 | A1 | 9/2012 | Hsu et al. | |
| 2014/0166383 | A1 * | 6/2014 | Arimune | B62M 6/45 180/206.3 |
| 2014/0166385 | A1 * | 6/2014 | Arimune | B62M 6/45 180/206.3 |
| 2015/0136508 | A1 * | 5/2015 | Strothmann | B62M 6/50 180/206.3 |
| 2015/0191215 | A1 * | 7/2015 | Kawakami | B62M 6/55 477/4 |

FOREIGN PATENT DOCUMENTS

| | | |
|---|---|---|
| JP | 11-180376 A | 7/1999 |
| JP | 3327162 B2 | 7/2002 |
| JP | 2002-240772 A | 8/2002 |
| JP | 2003-104278 A | 4/2003 |
| JP | 2004-38722 A | 2/2004 |
| JP | 3647965 B2 | 2/2005 |
| JP | 3832688 B2 | 7/2006 |
| JP | 2011-240919 A | 12/2011 |
| JP | 2012-12338 A | 1/2012 |
| WO | 2009/085773 A1 | 7/2009 |

* cited by examiner

BICYCLE CONTROL APPARATUS

CROSS-REFERENCE TO RELATED APPLICATIONS

This application claims priority under 35 U.S.C. §119 to Japanese Patent Application No. 2013-224121, filed Oct. 29, 2013, and Japanese Patent Application No. 2014-167488, filed Aug. 20, 2014. The entire disclosures of Japanese Patent Application Nos. 2013-224121 and 2014-167488 are hereby incorporated herein by reference.

BACKGROUND

Field of the Invention

This invention generally relates to a bicycle control apparatus. More specifically, the present invention relates to a bicycle control apparatus that controls a driving unit, which generates an auxiliary drive force, and an electric transmission unit.

Background Information

Bicycles are known that controls a driving unit, which generates auxiliary power, and an electric transmission unit (see, for example, Japanese Laid-Open Patent Publication No. H11-180376). In bicycle of this Publication, when a rider starts pedaling the crank rotational speed increases from 0 and the bicycle starts to move. Then, the manual drive force is detected. When the detected drive force becomes greater than or equal to a prescribed amount, a driving unit will operate and apply an assisting force. At this time, up to the crank rotational speed in a prescribed range in which the unit efficiency becomes high, the assist ratio will be increased to a maximum value according to the crank rotational speed. However, when the crank rotational speed exceeds the prescribed range, the assist ratio is gradually decreased from a maximum value according to the crank rotational speed. Therefore, when the crank rotational speed is in the prescribed range, the assist ratio is constant at the maximum value.

SUMMARY

Generally, the present disclosure is directed to various features of a bicycle control apparatus that controls a driving unit that generates an auxiliary drive force and an electric transmission unit. In a conventional bicycle control apparatus, when the crank rotational speed is in a prescribed range, the assist ratio is constant regardless of the manual drive force. Therefore, in the case of traveling at a stable crank rotational speed, variability in the manual drive force of the rider tends to become extreme, corresponding with the state of the road.

One aspect of the present invention is to provide a bicycle control apparatus having a controller that controls a driving unit, which generates auxiliary power, and an electric transmission unit to make a manual drive force that is less likely to fluctuate.

In view of the state of the known technology and in accordance with a first aspect of the present disclosure, a bicycle control apparatus is provided that basically comprises a manual drive force detecting device, a rotation state detection device and a controller. The manual drive force detecting device detects a manual drive force. The rotation state detection device detects a parameter relating to crankshaft rotation of a crankshaft. The controller is programmed to control at least one of a driving unit that generates an auxiliary drive force and an electric transmission unit so that the manual drive force and the parameter relating to the crankshaft rotation will be within a prescribed range.

In this bicycle control apparatus, at least one of either the driving unit or the electric transmission unit is controlled so that the manual drive force that is detected by the manual drive force detecting device and the rotation parameter that is detected by the rotation state detection device will be within a prescribed range. For example, in the case that the rotation parameter is within the prescribed range but the manual drive force is greater than the prescribed range, the auxiliary drive force (the assist ratio) should be increased. Conversely, upon determining that the manual drive force is less than the prescribed range, the driving unit should be controlled to decrease the auxiliary drive force (the assist ratio). Meanwhile, upon determining that the manual drive force is within the prescribed range but the rotation parameter is greater than the prescribed range, upshifting is conducted, and the auxiliary drive force control is operated when necessary. In the same way, upon determining that the rotation parameter is less than the prescribed range, downshifting is conducted, and the auxiliary drive force control is operated when necessary. Here, since at least one of either the driving unit or the electric transmission unit is controlled so that the rotation parameter and the manual drive force are within the prescribed range, the rotation parameter and the manual drive force are less likely to fluctuate.

The controller can have a first mode that preferentially controls the electric transmission unit and a second mode that preferentially controls the driving unit. In this case, the manual drive force and the rotation parameter can be changed simultaneously by preferentially controlling the electric transmission unit, and the power consumption can be suppressed. The manual drive force can be prevented from greatly changing without changing the rotation parameter by preferentially controlling the driving unit.

The controller can control the driving unit after controlling the electric transmission unit. In this case, the manual drive force and the rotation parameter can be changed simultaneously by controlling the electric transmission unit. For this reason, such as upon determining that the manual drive force and the rotation parameter are not greatly outside of the prescribed range, depending on the situation, the manual drive force and the rotation parameter can be put within the prescribed range by just controlling the electric transmission unit. With this configuration, the control can be made efficient.

Upon determining that the rotation parameter is less than the prescribed range, the controller can control the electric transmission unit so that the gear ratio will be small. In this case, by downshifting the gear shift in which the gear ratio becomes smaller, the manual drive force is reduced, and the rotation parameter can be made large, so that putting the rotation parameter within the prescribed range becomes easy.

Upon determining that the rotation parameter is greater than the prescribed range, the controller can control the electric transmission unit so that the gear ratio will be large. In this case, by upshifting so that the gear ratio becomes larger, the manual drive force is increased, and the rotation parameter can be made small, so that putting the rotation parameter within the prescribed range becomes easy.

Upon determining that the manual drive force is greater than the prescribed range, the controller can increase the auxiliary drive force. In this case, by increasing the auxiliary drive force, the manual drive force can be made small without changing the rotation parameter, so that putting the manual drive force within the prescribed range becomes easy.

Upon determining that the manual drive force is less than the prescribed range, the controller can decrease the auxiliary drive force. In this case, by decreasing the auxiliary drive force, the manual drive force can be increased without changing the rotation parameter, so that putting the manual drive force within the prescribed range becomes easy.

Upon determining that the manual drive force and the rotation parameter are not within a prescribed range, even if both the driving unit and the electric transmission unit are controlled, the controller can control both the driving unit and the electric transmission unit so that the current gear ratio and the auxiliary power are maintained.

Upon determining that the manual drive force is greater than the prescribed range and the rotation parameter is within a first range that is in the prescribed range, the controller can increase the auxiliary drive force. In this case, since the rotation parameter is less likely to fluctuate from the first range even if the auxiliary drive force is increased, the manual drive force can be put within the prescribed range by just controlling the driving unit.

The controller can control the electric transmission unit so that the gear ratio will be smaller when the manual drive force is greater than the first range and the rotation parameter is within a second range that is less than the rotation parameter that is in the middle of the prescribed range. In this case, by downshifting so that the gear ratio becomes smaller, the rotation parameter in the second range becomes larger, and the manual drive force is decreased. However, since the second range is within a range that is smaller than the rotation parameter in the middle of the prescribed range, there is a lower likelihood of going outside of the prescribed range even if the rotation parameter in the second range becomes large. Here, the rotation parameter and the manual drive force can be put within the prescribed range by just shifting the electric transmission unit.

The controller can control the electric transmission unit so that the gear ratio will be smaller and the auxiliary drive force can be increased when the manual drive force is greater than the second range and the rotation parameter is within a third range that is less than the rotation parameter that is in the middle of the prescribed range. In this case, since the manual drive force is within the third range in which the manual drive force is greater than the second range, and the rotation parameter is within a range that is less than the rotation parameter that is in the middle of the prescribed range, there is a great possibility that the rotation parameter will exceed the prescribed range if only the electric transmission unit is shifted. Therefore, by controlling the driving unit and increasing the auxiliary drive force without changing the rotation parameter, the rotation parameter and the manual drive force can be put within the prescribed range.

The controller can control the electric transmission unit so that the gear ratio will be larger and can increase the auxiliary drive force when the manual drive force is greater than the prescribed range and the rotation parameter is within a fourth range that is greater than the rotation parameter that is in the middle of the prescribed range. In this case, by upshifting so that the gear ratio becomes larger, the rotation parameter in the fourth range becomes smaller, and the manual drive force is increased. Since the fourth range is within a range that is greater than the rotation parameter in the middle of the prescribed range, the rotation parameter is less likely to go outside of the prescribed range even if the rotation parameter in the fourth range becomes small; however, since the manual drive force in the fourth range is within a range that is close to the manual drive force in the prescribed range, there is a risk that the manual drive force will exceed the prescribed range. Here, the rotation parameter and the manual drive force can be put within the prescribed range by upshifting the electric transmission unit so that the manual drive force is increased.

The controller can control the electric transmission unit so that the gear ratio will be smaller when the manual drive force is larger than the fourth range and the rotation parameter is within a fifth range that is greater than the rotation parameter that is in the middle of a prescribed range. In this case, by upshifting so that the gear ratio becomes larger, the rotation parameter in the fourth range becomes smaller, and the manual drive force is increased. Since the fifth range is within a range that is larger than the rotation parameter in the middle of the prescribed range, the rotation parameter is less likely to go outside of the prescribed range even if the rotation parameter in the fifth range becomes small. Additionally, since the fifth range is a range with a smaller manual drive force than the fourth range, there is a lower likelihood of going outside of the prescribed range even if the manual drive force is increased due to upshifting. Here, the rotation parameter and the manual drive force can be put in the prescribed range by just upshifting the electric transmission unit.

The manual drive force detecting device can detect the torque around the crankshaft as the manual drive force. In this case, the manual drive force can be easily detected.

The rotation state detection device can detect the rotational speed of the crankshaft as the rotation parameter. In this case, the rotation parameter can be easily detected.

The prescribed range relating to the torque is greater than or equal to 10 Nm, is less than or equal to 50 Nm, and is preferably greater than or equal to 20 Nm and less than or equal to 30 Nm. In this case, the prescribed range is set to be a preferable torque for a general rider.

The prescribed range relating to the rotational speed is greater than or equal to 30 rpm and less than or equal to 90 rpm; preferably, this can be greater than or equal to 45 rpm and less than or equal to 70 rpm. In this case, the prescribed range is set to be a preferable rotation parameter for a general rider.

The prescribed range can be settable or changeable. In this case, the prescribed range can be set or changed according to the preference, physical strength, etc., of the rider.

The bicycle control apparatus can further comprise an operation part. The controller can set or change the prescribed range based on at least one of the manual drive force detected by the manual drive force detecting device and the parameter relating to the rotation detected by the rotation state detection device, when the operation part is operated during traveling. In this case, the prescribed range can be set or changed according to the preference, physical strength, etc., of the rider, by operating the operation part.

The manual drive force detecting device can detect the manual drive force at a prescribed time interval during traveling. The controller can set or change the prescribed range according to a plurality of manual drive forces detected by the manual drive force detecting device or an average value of the plurality of manual drive forces. In this case, since the prescribed range can be set or changed according to the most recent manual drive force of the rider, the prescribed range can be set or changed according to the condition of the rider (the physical condition, the level of fatigue, etc.) and the condition of the traveling path (for example, the degree of slope of the traveling path, the road surface condition of the traveling path (for example, tarmac or gravel)).

The rotation state detection device can detect the parameter relating to the rotation at a prescribed time interval during traveling. The controller can set or change the prescribed range according to a plurality of parameters relating to the rotation detected by the rotation state detection device or an average value of the plurality of parameters relating to the rotation. In this case, since the prescribed range can be set or changed according to the rotation parameter, for example, cadence, the prescribed range can be set or changed according to the condition of the rider (the physical condition, the level of fatigue, etc.) and the condition of the traveling path (for example, the degree of slope of the traveling path, the road surface condition of the traveling path (for example, tarmac or gravel)).

The plurality of manual drive forces detected by the manual drive force detecting device can include at least a manual drive force detected by the manual drive force detecting device immediately before the operation part being operated. In this case, since the prescribed range can be set or changed according to the manual drive force immediately before the operation by the rider, the prescribed range can be set or changed quickly.

The plurality of parameters relating to the rotation detected by the rotation state detection device can include at least a parameter relating to the rotation detected by the rotation state detection device immediately before the operation part being operated.

The controller can set the prescribed range so that the average value of the plurality of manual drive forces is located at the center of the prescribed range. In this case, the prescribed range is suitable for the rider.

The controller can set the prescribed range so that the average value of the plurality of parameters relating to the rotation is located at the center of the prescribed range. In this case, the prescribed range is suitable for the rider.

The controller can set the prescribed range based on at least one of the manual drive force detected by the manual drive force detecting device and the parameter relating to the rotation detected by the rotation state detection device, when the operation part is operated during traveling.

The plurality of manual drive forces detected by the manual drive force detecting device can include at least a manual drive force detected by the manual drive force detecting device immediately after the operation part being operated.

The plurality of parameters relating to the rotation detected by the rotation state detection device can include at least a parameter relating to the rotation detected by the rotation state detection device immediately after the operation part being operated.

According to the present invention, the parameter relating to the rotation of the crankshaft and the manual drive force are less likely to fluctuate.

Also other objects, features, aspects and advantages of the disclosed bicycle control apparatus will become apparent to those skilled in the art from the following detailed description, which, read conjunction with the annexed drawings, discloses one embodiment of the bicycle control apparatus.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
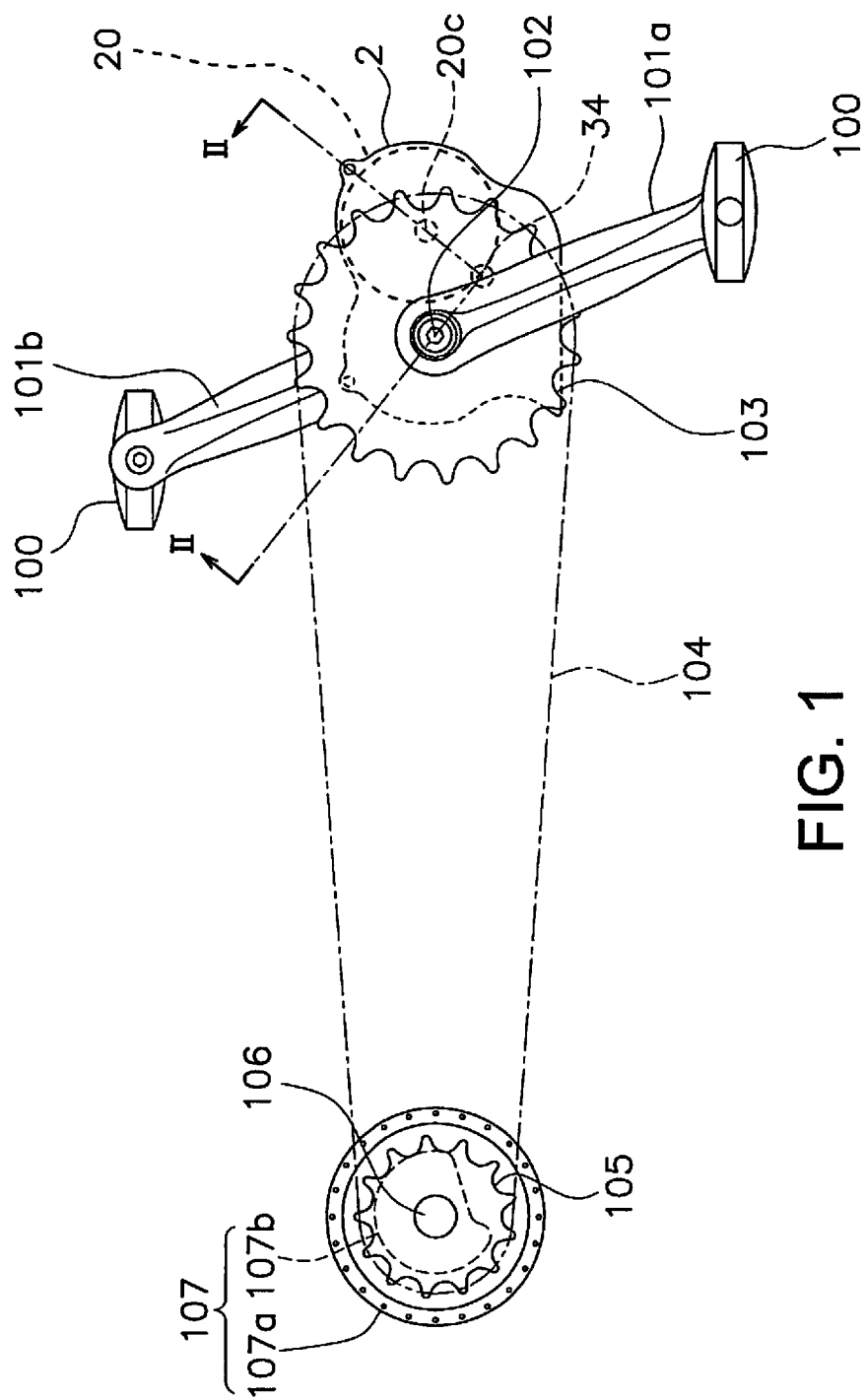
FIG. 1 is a side elevational view of a part of a power-assisted bicycle that is equipped with a bicycle control apparatus in accordance with a first embodiment.

Referring initially to FIG. 1, a power-assisted bicycle is illustrated that is equipped with a bicycle control apparatus 1 in accordance with a first embodiment. The bicycle control apparatus 1 includes a driving unit 2 in the first embodiment. The bicycle control apparatus 1 receives a pedaling force that acts on pedals 100. The pedaling force is one example of a manual drive force. The driving unit 2 comprises a motor 20 (electric motor) for providing assistance to the manual drive force. The bicycle control apparatus 1 transmits the pedaling force to a drive train such that the pedaling force is transmitted via the following route: a crank arm 101a (or a crank arm 101b)→crank axle 102→the driving unit 2→a front sprocket 103→a chain 104→a rear sprocket 105. In this way, the bicycle control apparatus 1 transmits the pedaling force acting on the pedals 100 to an electric transmission unit 107. The electric transmission unit 107 comprises, for example, an interior gearbox 107a and a gear shift motor 107b. The interior gearbox 107a receives the pedaling force. The interior gearbox 107a is installed around an axle 106 of the rear wheels. The electric transmission unit 107 comprises, for example, an interior gearbox 107a and a gear shift motor 107b. The interior gearbox 107a is operated by a gear shift of the gear shift motor 107b. Additionally, the electric transmission unit 107 comprises a gear number sensor 107c (refer to FIG. 3) that can detect the gear shift position (the gear position) of the interior gearbox 107a.

The power-assisted bicycle combines the output (motor drive force) of the motor 20 (see FIG. 2) to the manual drive force as an auxiliary drive force (auxiliary) power for assisting rider. In the first embodiment, the driving unit 2 further comprises a torque sensor 50 that detects the pedaling force of the rider. When a detected torque value exceeds a preset value, the motor 20 is started, and a torque corresponding to the pedaling force is generated as auxiliary power. The torque sensor 50 is one example of a manual drive force detecting device or a manual drive force detecting sensor. The motor 20 is generally disposed near a portion connecting a lower end portion of a seat tube of a bicycle frame and a rear end portion of a down tube of the bicycle frame. The motor 20 is fixed to the frame by a bolt that is not illustrated. A battery is disposed along a rear carrier, a down tube or a seat tube for supplying electricity to the motor 20.

Figure 2:
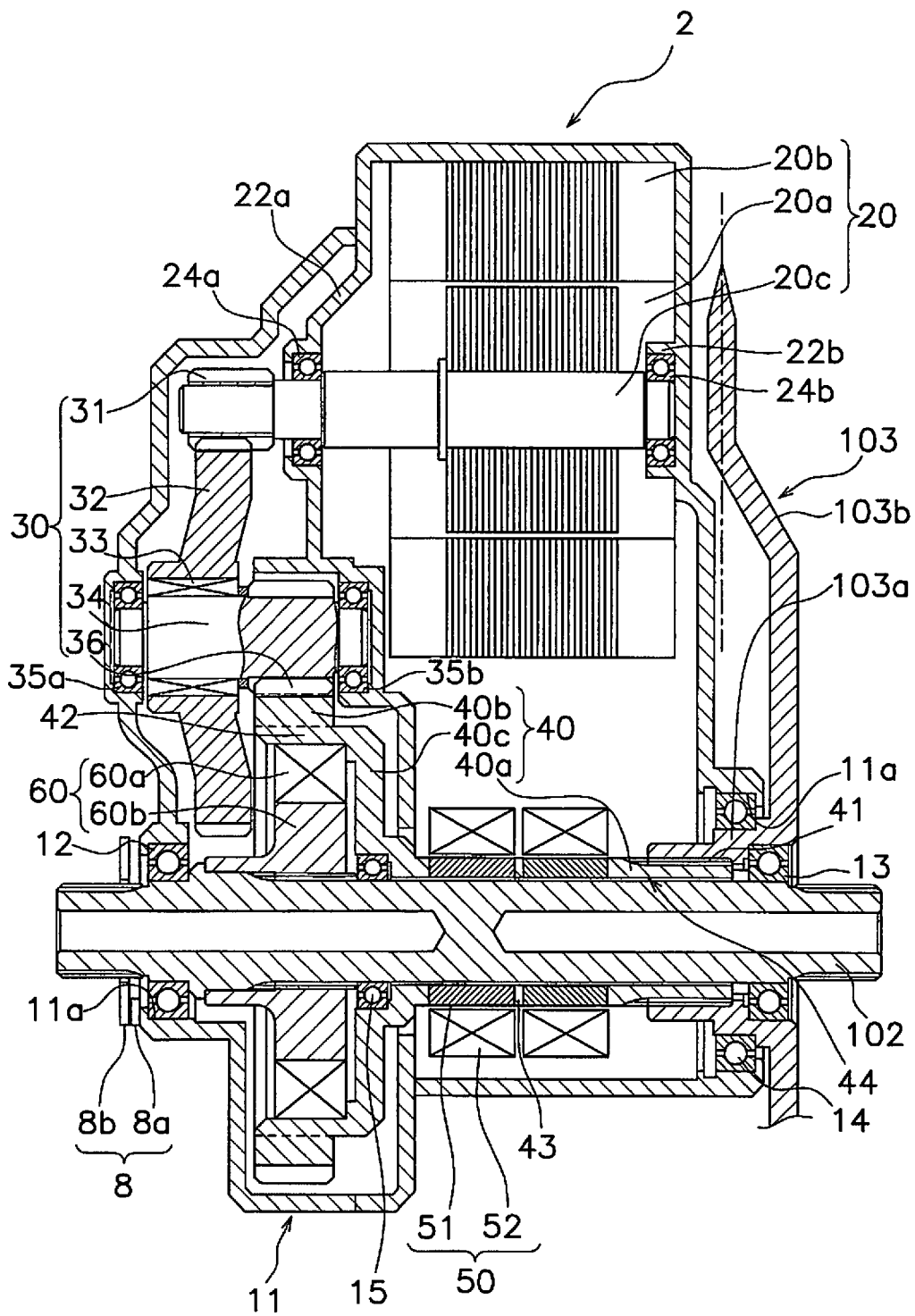
FIG. 2 is a cross-sectional view of the driving unit taken along the section line II-II shown in FIG. 1.

As shown in FIG. 2, in addition to the motor 20 and the torque sensor 50, the driving unit 2 further comprises a first connecting part 30, a second connecting part 60 and a drive force transmitting part 4, and a torque sensor 50. In the driving unit 2, the crank axle 102 is inserted in a through-hole 11a of a casing 11. The two axial end portions of the crank axle 102 each protrude from the casing 11. The end portion of the crank axle 102 that is on the opposite side of the front sprocket 103 is rotatably supported on the casing 11 via a first axle bearing 12. The front sprocket 103 is rotatably supported on the crank axle 102 via a second axle bearing 13. The end portion of the crank axle 102 that is on the side with the front sprocket 103 is rotatably supported on the casing 11 via a third axle bearing 14 with the front sprocket 103 rotatably supported between the casing 11 and the crank axle 102. Thus, the front sprocket 103 is rotatably supported on the casing 11 via the third axle bearing 14. The crank arms 101a and 101b (refer to FIG. 1) are attached to both axial ends of the crank axle 102 so that they are detachable and integrally rotatable. One of the crank arms 101a and 101b can be configured to be non-detachable from the crank axle 102. The first through the third axle bearings 12, 13 and 14 are, for example, radial ball bearings.

Configuration of the Assisting Motor

The motor 20 constitutes an assisting motor. The motor 20 basically comprises a rotor 20a, a stator 20b and a rotational axle 20c. The motor 20 is disposed in the casing 11 so that the rotational axle 20c is arranged parallel to the crank axle 102. The rotational axle 20c of the motor 20 is rotatably supported by a fourth axle bearing 24a and a fifth axle bearing 24b. The fourth and fifth axle bearings 24a and 24b are axially spaced apart along the axis of the rotational axle 20c. The rotational axle 20c is fixed to the rotor 20a. The stator 20b is installed on an outer perimeter of the rotor 20a. The stator 20b is fixed to the casing 11. The casing 11 is provided with a pair of attachment portions 22a and 22b. The fourth axle bearing 24a and the fifth axle bearing 24b are supported on the casing 11 by the attachment portions 22a and 22b respectively. The fourth axle bearing 24a and the fifth axle bearing 24b are, for example, radial ball bearings.

Configuration of the First Connecting Part

The first connecting part 30 comprises a first gear 31, a second gear 32, a first one-way clutch 33, a rotational axle 34 and a third gear 36. The output of the motor 20 is transmitted to the driving force transmitting part 40 via the first gear 31→the second gear 32→the first one-way clutch 33→the rotational axle 34→the third gear 36. The rotational axes of the rotational axle 34, the crank axle 102 and the rotational axle 20c of the motor 20 are each disposed parallel to each other. The rotational axle 34 is installed in a position such that its rotational axis is spaced from a plane having the rotational axes of the crank axle 102 and the rotational axle 20c of the motor 20. With this configuration, the crank axle 102 and the rotational axle 20c of the motor 20 can be disposed as near to each other as possible, so that the driving unit 2 can be made small.

The first gear 31 is non-rotatably coupled with the rotational axle 20c so that the rotational axle 20c and the first gear 31 rotate together. With this configuration, the first gear 31 rotates integrally with the rotational axle 20c.

The second gear 32 is engaged with the first gear 31. The second gear 32 is rotatably supported in one direction around the rotational axle 34 via the first one-way clutch 33. The first one-way clutch 33 is, for example, a one-way clutch comprising a pawl and a ratchet or a roller clutch. The first one-way clutch 33 is installed so that the rotation of the second gear 32 is transmitted to the rotational axle 34 but the rotation of the rotational axle 34 is not transmitted to the second gear 32.

The rotational axle 34 is rotatably supported by a sixth axle bearing 35a and a seventh axle bearing 35b. The sixth and seventh axle bearings 35a and 35b are axially spaced apart along the axis of the rotational axle 34. The sixth axle bearing 35a and the seventh axle bearing 35b are supported by the casing 11. The sixth axle bearing 35a and the seventh axle bearing 35b are, for example, radial ball bearing.

The third gear 36 is fixedly coupled to the rotational axle 34. With this configuration, the third gear 36 rotates integrally with the rotational axle 34. The third gear 36 can be integrally formed with the rotational axle 34 as illustrated.

The third gear 36 is engaged with the driving force transmitting part 40 as discussed below.

Here, the number of teeth of the second gear 32 is greater than the number of teeth of the first gear 31, and the number of teeth of the driving force transmitting part 40 is greater than the number of teeth of the third gear 36. Additionally, the number of teeth of the second gear 32 is greater than the number of teeth of the third gear 36. With the first gear 31 and the second gear 32 engaging with each other and the third gear 36 and the driving force transmitting part 40 engaging with each other, a double gear reduction is realized. In this way, the first connecting part 30 constitutes a deceleration mechanism.

Configuration of the Second Connecting Part

The second connecting part 60 comprises a second one-way clutch 60a and a one-way clutch attachment member 60b. The pedaling force of the rider is transmitted to the driving force transmitting part 40 via the pedal 100→the crank arm 101a (or the crank arm 101b)→the crank axle 102→the second one-way clutch 60a. The one-way clutch attachment member 60b is non-rotatably coupled with the crank axle 102 so that the one-way clutch attachment member 60b rotates with the crank axle 102. With this configuration, the one-way clutch attachment member 60b integrally rotates with the crank axle 102. The second one-way clutch 60a is installed on an outer perimeter part of the one-way clutch attachment member 60b. The second one-way clutch 60a is, for example, a one-way clutch comprising a pawl and a ratchet or by a roller clutch. The second one-way clutch 60a is installed so that the rotation of the crank axle 102 is transmitted to a coupling section 42 but the rotation of the coupling section 42 is not transmitted to the crank axle 102.

Configuration of the Driving Force Transmitting Part

Here, the driving force transmitting part 40 is formed in a tubular shape. The driving force transmitting part 40 comprises a first tube portion 40a, a second tube portion 40b and a connecting portion 40c. The first tube portion 40a, the second tube portion 40b and the connecting portion 40c are integrally formed as a one-piece member (i.e., a single member). The first tube portion 40a has a sprocket connecting portion 41. The second tube portion 40b forms a coupling portion 42. The first tube portion 40a has a sensor locating part 43. The connecting portion 40c connects the first tube portion 40a and the second tube portion 40b. In this way, the driving force transmitting part 40 comprises the sprocket connecting portion 41, the coupling portion 42 and the sensor locating part 43. The driving force transmitting part 40 transmits the torque that combines the output of the motor 20 and the torque of the crank axle 102 to the front sprocket 103. Preferably, the driving force transmitting part 40 further comprises an insertion hole 44 to insert the crank axle 102.

The sprocket connecting portion 41 is coupled with the front sprocket 103. The sprocket connecting portion 41 non-rotatably couples the sprocket 103 to the driving force transmitting part 40 so that they rotate together. For example, the sprocket connecting portion 41 can be one or more serrations and/or splines as illustrated in FIG. 2. The front sprocket 103 can also be inserted in the sprocket connecting portion 41. The end portion of the driving force transmitting part 40 that is on the side of the sprocket connecting portion 41 is rotatably supported by the casing 11 via the front sprocket 103 and the third axle bearing 14. The front sprocket 103 comprises a base 103a and a sprocket main body 103b. The base 103a is connected to the sprocket connecting portion 41. The base 103a is formed in a tubular shape. The sprocket connecting portion 41 is connected to an inner perimeter part of the base 103a. Additionally, the second axle bearing 13 is supported by an inner peripheral portion of the base 103a of the front sprocket 103. The outer peripheral portion of the base 103a of the front sprocket 103 supports the third axle bearing 14. The base 103a protrudes outward from the casing 11 via the through-hole 11a of the casing 11.

The sprocket main body 103b has a plurality of teeth formed on an outer peripheral portion. The sprocket main body 103b extends radially from an end portion of the base 103a that protrudes outside of the casing 11. In the present embodiment, the base 103a and the sprocket main body 103b are integrally formed as a one-piece member, but they can also be formed separately. In the present embodiment, the outer peripheral portion of the sprocket main body 103b is formed so as to be offset from a proximal end portion that is connected to the base 103a with respect to a sidewall of the casing 11.

The coupling portion 42 operatively couples the first connecting part 30 and the second connecting part 60. In other words, the coupling portion 42 has outer gear teeth that are engaged with the teeth of the third gear 36, and inner splines that are connected to the second one-way clutch 60a. The coupling portion 42 should, preferably, be installed at a distance from the sprocket connecting portion 41 in an axial direction of the axis of the crank axle 102, so that the torque sensor 50 can easily detect the torsion that is generated in the driving force transmitting part 40 as discussed below.

As previously mentioned, the second tube portion 40b forms the coupling portion 42. The second tube portion 40b is formed in a tubular shape with an outer diameter that is larger than an outer diameter of the first tube portion 40a. The connecting portion 40c extends radially outward from the end portion of the first tube portion 40a that is on the opposite side of the sprocket connecting portion 41. The connecting portion 40c extends in a radial direction with respect to the crank axle 102 between the first tube portion 40a and the second tube portion 40b. An inner peripheral portion of the connecting portion 40c is connected to the first tube portion 40a, while outer peripheral portion of the connecting portion 40c is connected to the second tube portion 40b. The second tube portion 40b extends from the connecting portion 40c away from the sprocket connecting portion 41.

The third gear 36 is operatively connected to the outer peripheral portion of the coupling portion 42, and the second one-way clutch 60a is operatively connected to the inner peripheral portion. The third gear 36 and the second one-way clutch 60a are installed so that at least a part of them will overlap as viewed in a direction (radial direction) that is perpendicular to the crank axle 102.

The end portion of the first tube portion 40a that is on the opposite side of the sprocket connecting portion 41 is rotatably supported by the crank axle 102 via an eighth axle bearing 15. The eighth axle bearing 15 is disposed between the connecting portion 40c and the crank axle 102. The eighth axle bearing 15 is, for example, radial ball bearings.

At least one part of the torque sensor 50 is installed on the sensor locating part 43. The torque sensor 50 is a magnetostrictive sensor that comprises a magnetostrictor 51 and a detection coil 52. The sensor locating part 43 is disposed between the sprocket connecting portion 41 and the coupling portion 42. Preferably, the sensor locating part 43 is installed on an outer perimeter part of the first tube portion 40a. For example, the magnetostrictor 51 is installed in the sensor locating part 43. As shown in FIG. 2, when the magnetostrictor 51 is installed in the sensor locating part 43, the detection coil 52 is installed around an outer perimeter side of the first tube portion 40a for detecting the torsion of the magnetostrictor 51. In this case, the torque sensor 50 (a magnetostrictive sensor) that detects the torsion of the first tube portion 40a is formed by the magnetostrictor 51 and the detection coil 52. The detection coil 52 is preferably installed in a coil retaining member (not shown) that retains the detection coil 52 around the first tube portion 40a. The coil retaining member can be fixed to the casing 11. The torsion of the first tube portion 40a corresponds to the torque that is generated in the first tube portion 40a.

The torque sensor 50, shown in FIG. 2, is only an example, and other types of torque sensing devices can be used such as a strain gauge or a semiconductor strain sensor can be installed in the sensor locating part 43 instead of the torque sensor 50. In the case of installing a strain gauge or a semiconductor strain sensor, etc., in the sensor locating part 43, for example, a transmitter that wirelessly transmits signals from the strain gauge, semiconductor strain sensor, etc., is also installed in the sensor locating part 43 and outputs those signals or information based on those signals to the outside with a radio. Additionally, an optical sensor that detects the strain of the sensor locating part 43 using light can be installed instead of the torque sensor 50 as a torque sensing device.

Configuration of the Electric Power and Electricity

Figure 3:
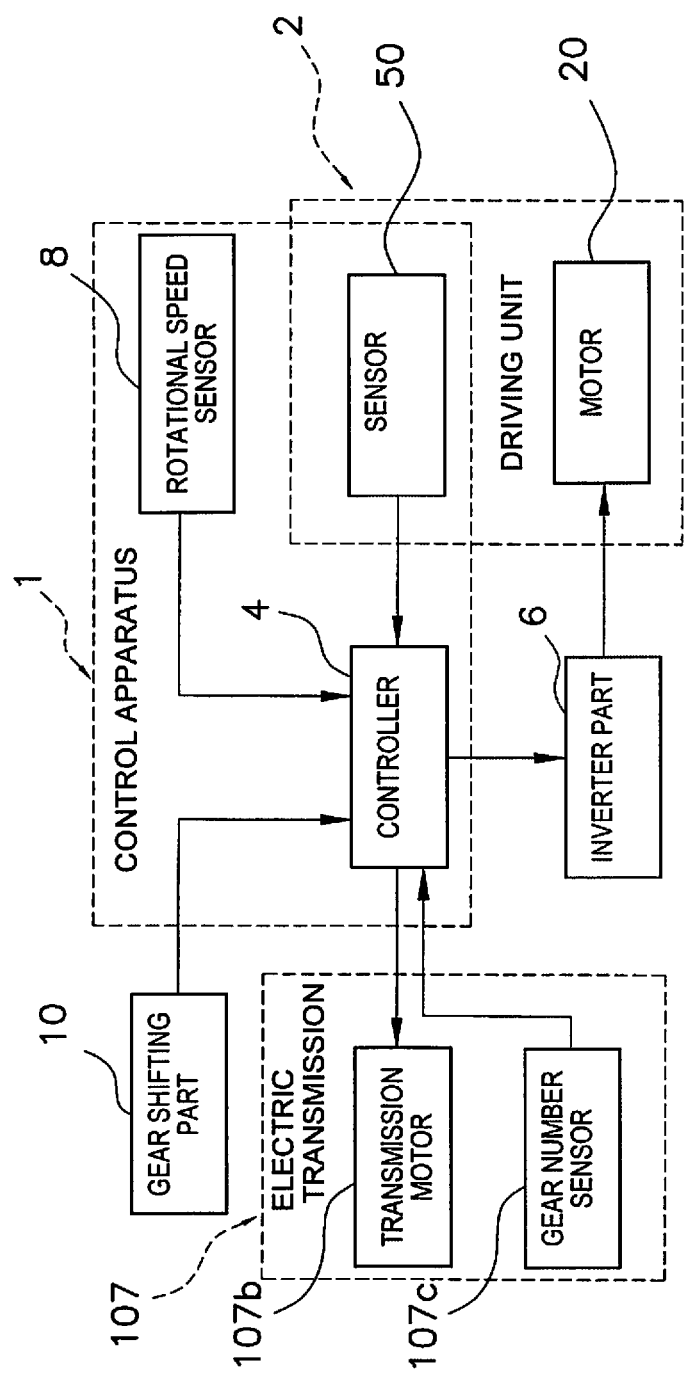
FIG. 3 is a block diagram showing the configuration of the bicycle control apparatus including the driving unit.

FIG. 3 is a block diagram showing the configuration of the electric power and electricity of a power-assisted bicycle including the driving unit 2. The power-assisted bicycle comprises the control apparatus 1, the driving unit 2, an inverter part 6, the electric transmission unit 107, and a gear shifting part 10. The control apparatus 1 and the inverter part 6 can also be included in the driving unit 2. Additionally, at least one of the control apparatus 1 or the inverter part 6 can be installed on the inner or outer peripheral portion of the casing 11 of the driving unit 2.

The control apparatus 1 comprises a controller 4, a rotational speed sensor 8, and the torque sensor 50. The rotational speed sensor 8 is one example of a rotation state detection device. The controller 4 controls the inverter part 6 according to the pedaling force and the detection results of the rotational speed sensor 8. Additionally, the controller controls the electric transmission unit 107 according to the output of the rotational speed sensor 8 and the detection results of a gear number sensor 107c. Here, the torque sensor 50 detects the torque that combines the output of the motor 20 and the torque of the crank axle 102. The controller 4 comprises, for example, a central processing unit (CPU) and a memory that stores a prescribed program. The controller 4 has information regarding the correlation between the instruction that is output to the inverter part 6 in order to drive the motor 20 and the torque that the motor 20 outputs according to this instruction. The correlation information can be expressed with something like a table or an equation. With this configuration, the controller 4 can recognize the output torque of the motor 20. Therefore, the controller 4 can calculate just the pedaling force by subtracting the output torque of the motor 20 that is detected by the torque sensor 50 from the combined torque the output torque of the motor 20 and the torque of the crank axle 102. With this configuration, the controller 4 can control the driving unit 2 according to the pedaling force. The controller 4 can also estimate the drive force of the motor 20 by measuring the electric current that flows in the motor 20.

The motor 20 is, for example, a three-phase brushless DC motor and is driven by the inverter part 6. The inverter part 6 converts DC to a three-phase AC with a switching control based on instructions from the controller 4. The rotational speed sensor 8 detects the rotational speed of the crank axle 102. The rotational speed sensor 8, as shown in FIG. 2, comprises a magnetic sensor 8a and a magnet 8b. The magnetic sensor 8a is disposed on the casing 11. The magnet 8b is disposed on the periphery of the crank axle 102 in a position that opposes the magnetic sensor 8a. In the first embodiment, the magnet 8b is disposed on the opposite end of the crank axle 102 from the end having the front sprocket 103. The magnetic sensor 8a is, for example, a Hall Effect element that can detect the flux of the magnet 8b. The magnet 8b is, for example, ring shaped, in which a plurality of S-poles and N-poles are alternately disposed in a circumferential direction around the crank axle 102. Alternatively, the magnet 8b can be, for example, installed on the crank arm 101b that is disposed on the opposite end of the crank axle 102 from the end having the front sprocket 103.

The electric transmission unit 107 comprises an electric actuator and a gearbox. In the present embodiment, as mentioned above, the electric transmission unit 107 basically comprises the interior gearbox 107a and the gear shift motor 107b. However, the electric transmission unit can have an external gearbox and an electric actuator (for example, a solenoid) instead of a motor. The gear shift motor 107b operates the gearbox according to instructions from the controller 4.

The gear shifting part 10 comprises a switch, and gives switching instructions for shifting to the controller 4. The controller 4 has a manual shift mode and an automatic shift mode. In the manual shift mode, the controller 4 controls the gear shift motor 107b according to the switching instructions for shifting from the gear shifting part 10. In the automatic shift mode, the controller 4 controls the electric transmission unit 107 and the driving unit 2 according to the detection of the rotational speed sensor 8 and the torque sensor 50. Specifically, in the first embodiment, the controller 4 cooperatively controls the electric transmission unit 107 and the driving unit 2 according to the detected speed value of the rotational speed sensor 8 (a rotation parameter) and the detected torque value of the torque sensor 50 (the pedaling force).

Cooperative Control of the Controller

Next, the cooperative control of the controller 4 according to the first embodiment will be explained based on FIGS. 4 and 5.

Figure 4:
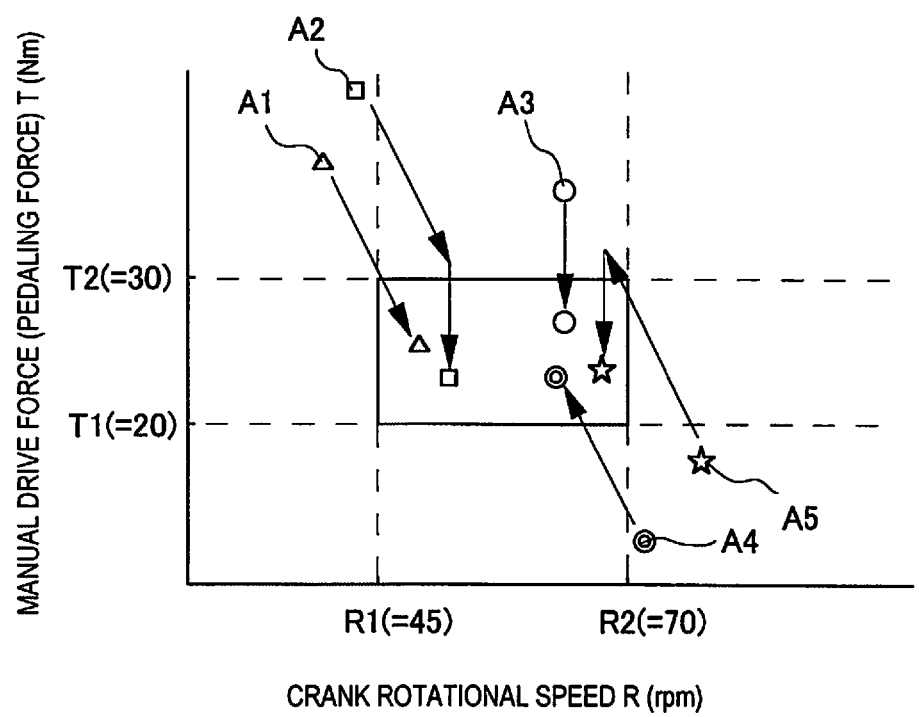
FIG. 4 is a graph showing the operation that converges the manual drive force and the crank rotational speed to the prescribed range in accordance with the first embodiment.

FIG. 4 is a graph with the manual drive force T (Nm) as the vertical axis and the crank rotational speed R (rpm) as the horizontal axis. The crank rotational speed R is one example of a parameter relating to the rotation of the crank axle 102. In the first embodiment, the electric transmission unit 107 and the driving unit 2 are cooperatively controlled so that the manual drive force T and the crank rotational speed R will be within the prescribed range shown by the bold line in FIG. 4. In the present embodiment, the electric transmission unit 107 and the driving unit 2 are cooperatively controlled so that the manual drive force T will be in a prescribed range from a lower limit manual drive force T1 to an upper limit manual drive force T2 and so that the crank rotational speed R will be in a prescribed range from a lower limit rotational speed R1 to an upper limit rotational speed R2. Preferably, the prescribed range of the manual drive force T is greater than or equal to 10 Nm and less than or equal to 50 Nm. More preferably, the prescribed range of the manual drive force T is greater than or equal to 20 Nm and less than or equal to 30 Nm. Preferably, the prescribed range of the crank rotational speed R is greater than or equal to 30 rpm and less than or equal to 90 rpm. More preferably, the prescribed range of the crank rotational speed R is greater than or equal to 45 rpm and less than or equal to 70 rpm. In a prescribed range shown in FIG. 4, as an example, the prescribed range of the manual drive force T is greater than or equal to 20 Nm and less than or equal to 30 Nm, and the prescribed range of the crank rotational speed R is greater than or equal to 45 rpm and less than or equal to 70 rpm. Meanwhile, the prescribed range can be freely changed according to the physical strength of the rider, etc. If the prescribed range is set in this kind of range, the prescribed range will be set so in order to be a preferable pedaling force and rotation parameter of a general rider.

Next, the control operation to converge the manual drive force T and the crank rotational speed R in the prescribed range shown in FIG. 4 will be explained based on the flowchart shown in FIG. 5. Meanwhile, FIG. 5 is one example of the control operation, and the present invention is not limited by the control operation shown in FIG. 5.

Figure 5:
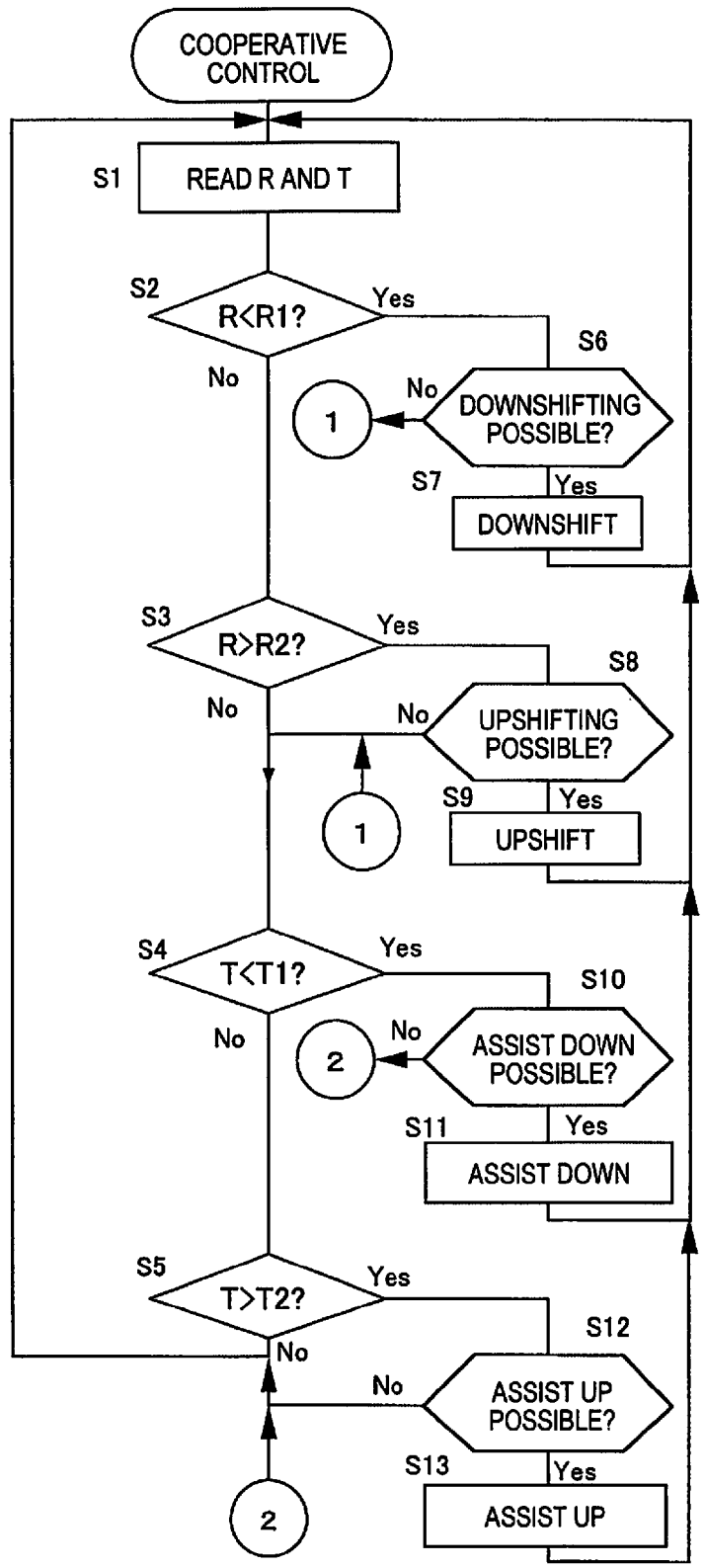
FIG. 5 is a flowchart showing a control operation executed by the controller that converges the manual drive force and the crank rotational speed to the prescribed range in accordance with the first embodiment.

In FIG. 5, in step S1, the controller 4 reads the crank rotational speed R and the manual drive force T from the rotational speed sensor 8 and the torque sensor 50. In step S2, the controller 4 determines whether or not the crank rotational speed R is less than the lower limit rotational speed R1 in the prescribed range. In step S3, the controller 4 determines whether or not the crank rotational speed R exceeds the upper limit rotational speed R2 in the prescribed range. In step S4, the controller 4 determines whether or not the manual drive force T that is read is less than the lower limit manual drive force T1 in the prescribed range. In step S5, the controller 4 determines whether or not the manual drive force T that was detected exceeds the upper limit manual drive force T2 in the prescribed range.

In the cooperative control shown in FIG. 5, the controller 4 determines whether or not the manual drive force T and the crank rotational speed R are in the prescribed range by preferentially controlling the crank rotational speed R over the manual drive force T. In other words, the controller 4 controls the electric transmission unit 107 preferentially over controlling the driving unit 2. This is because, in a shift control, the crank rotational speed R and the manual drive force T change simultaneously. However, in an assist control, the crank rotational speed R is not easily changed, and the pedaling force is mainly changed. Therefore, if the crank rotational speed R is in the prescribed range (R1≤R≤R2), the manual drive force T will be in the prescribed range (T1≤T≤T2) just by conducting assist control without conducting shift control.

Upon the controller 4 determining that the crank rotational speed R is less than the lower limit rotational speed R1, the process proceeds from step S2 to step S6. In step S6, the controller 4 determines whether or not downshifting is possible. This determination is made by the controller 4 by reading data from the gear number sensor 107c. For example, when the gear position is at the lowest gear (the gear position at which the gear ratio is the smallest), this determination will be "No." If it is possible to downshift, then the process proceeds from step S6 to step S7. In step S7, the controller 4 outputs an instruction to downshift toward a gear position that is one step on the low speed side than the current gear position to the electric transmission unit 107. Then, the process proceeds back to step S1. In step S1, the controller 4 reads the crank rotational speed R and the manual drive force T in the next control cycle. Additionally, when downshifting is not possible, the crank rotational speed R cannot be put in a prescribed range even if the electric transmission unit 107 is controlled. Therefore, from step S6, the process proceeds to step S4 and conducts assist control while maintaining the current gear position. When the crank rotational speed R is greater than or equal to the lower limit rotational speed R1, the process proceeds from step S2 to step S3.

Upon the controller 4 determining that the crank rotational speed R exceeds the upper limit rotational speed R2, the process proceeds from step S3 to step S8. In step S8, the controller 4 determines whether or not upshifting is possible. This determination is made by reading data from the gear number sensor 107c, as in the same manner as with downshifting. For example, when the gear position is at the highest gear (the gear position at which the gear ratio is the largest), this determination will be "No." If upshifting is possible, the process proceeds from step S8 to step S9. In step S9, the controller 4 outputs an instruction to upshift toward a gear position that is one step on the high speed side than the current gear position to the electric transmission unit 107. Then, the process proceeds back to step S1. In step S1, the controller 4 reads the crank rotational speed R and the manual drive force T in the next control cycle. Additionally, when upshifting is not possible, the crank rotational speed R cannot be put in the prescribed range even if the electric transmission unit 107 is controlled. Therefore, from step S8, the process proceeds to step S4 and conducts assist control while maintaining the current gear position. When the crank rotational speed R is less than or equal to the upper limit rotational speed R2, the process proceeds from step S3 to step S4. Therefore, as long as downshifting and upshifting possible, the controller 4 will repeat shift control process from step S1 to step S9 until the crank rotational speed R is in the prescribed range. When the crank rotational speed R is in the prescribed range, the process proceeds to step S4.

Upon the controller 4 determining that the manual drive force T is less than the lower limit manual drive force T1, the process proceeds from step S4 to step S10. In step S10, the controller 4 determines whether or not assist down is possible. This determination is made by referring to the current output state of the motor 20 (the control instruction value to the motor 20) or the current assist ratio (the output of the motor 20 with respect to the manual drive force). For example, when the output of the motor 20 is zero or when the assist ratio is 0, the motor 20 is not in operation, so the determination in step S10 will be "No." Assist down means decreasing the proportion of the output of the motor 20 with respect to the manual drive force. If assist down is possible, the process proceeds from step S10 to step S11, and an assist down process is conducted. In the assist down process, the controller 4 outputs an instruction to the inverter part 6 to make the output of the motor 20 lower than the current output of the motor 20 by a prescribed proportion (for example, an output that is 10% lower) or to make the assist ratio lower than the current assist ratio by a prescribed proportion (for example, an assist ratio that is 10% lower). Then, the process proceeds to step S1. Upon the controller 4 determining that assist down is not possible, since the manual drive force T cannot be put in the prescribed range even if the driving unit 2 is controlled, the process returns to step S1 and maintains the current assist ratio. When the manual drive force T is greater than or equal to the lower limit manual drive force T1, the process proceeds from step S4 to step S5.

Upon the controller 4 determining that the manual drive force T exceeded the upper limit manual drive force T2, the process proceeds from step S5 to step S12. In step S12, the controller 4 determines whether or not assist up is possible. Assist up means increasing the proportion of the output of the motor 20 with respect to the manual drive force. This determination is made by the controller 4 by referring to the current assist ratio, as in the case with step S10. For example, if the assist ratio is 200 percent, this determination will be "No." If assist up is possible, then the process proceeds from step S12 to step S13, and an assist up process is conducted. In the assist up process, the controller 4 outputs an instruction to the inverter part 6 to make the output of the motor 20 higher than the current output of the motor 20 by a prescribed proportion (for example, an output that is 10% higher) or to make the assist ratio higher than the current assist ratio by a prescribed proportion (for example, an assist ratio that is 10% higher). Then, the process proceeds to step S1. When assist up is not possible, since the manual drive force T cannot be put in the prescribed range even if the driving unit 2 is controlled, the process returns to step S1 and maintains the current assist ratio.

Next, the above-described control operation will be explained in detail using an example in which the current crank rotational speed R and the pedaling force are detected from states A1, A2, A3, A4, and A5 as indicated by square, triangle, circle, double circle, and star marks in FIG. 4.

For example, if the bicycle is traveling in state A1 as indicated by the triangle mark in FIG. 4, this indicates that the manual drive force T was decreased to the prescribed range with the determination in step S2 being "Yes" and just by being shift processed (downshifted) in step S7. If the bicycle is traveling in state A2 as indicated by the square mark, this means that the manual drive force T was not decreased to the prescribed range even though the determination in step S3 was "Yes" and downshifting occurred in step S7. In this case, the determination in step S5 becomes "Yes," the assist processing (assist up) is conducted in step S12, and the manual drive force T is put in the prescribed range. If the bicycle is traveling in state A3 as indicated by the circle mark, the crank rotational speed R is already in the prescribed range; therefore, the determinations in both step S2 and step S3 was "No." Then, the manual drive force T will be put in the prescribed range by just conducting the assist process (assist up) in step S13.

In the case of a double circle, this shows an example in which the crank rotational speed R and the manual drive force T are in the prescribed range with just a shift process (upshifting) from state A4. In the case of the star mark, this shows an example in which the prescribed range is reached by a shift process (upshifting), then the assist process (assist up) from state A5. Meanwhile, while not drawn in FIG. 4, when the manual drive force T is less than the prescribed range when the crank rotational speed R is in the prescribed range, the manual drive force T will be put in the prescribed range by just conducting an assist process (assist down) in the same way as with the circle mark.

In this way, in the first embodiment, the crank rotational speed (a parameter relating to the rotation of the crankshaft) R and the pedaling force (the manual drive force) T are detected; after shifting so that the crank rotational speed R is put in the prescribed range, that the control puts the manual drive force T in the prescribed range by assist controlling. With this configuration, power consumption can be suppressed. Additionally, since at least one of the gearbox or the motor 20 is controlled so that the crank rotational speed R and the manual drive force T are in the prescribed range, fluctuation in the pedaling power of the rider can be suppressed. Additionally, depending on the situation, the manual drive force T and the crank rotational speed R can be put in the prescribed range by just controlling the electric transmission unit 107. With this configuration, the control can be made to be efficient.

First Modification of the First Embodiment

Figure 6:
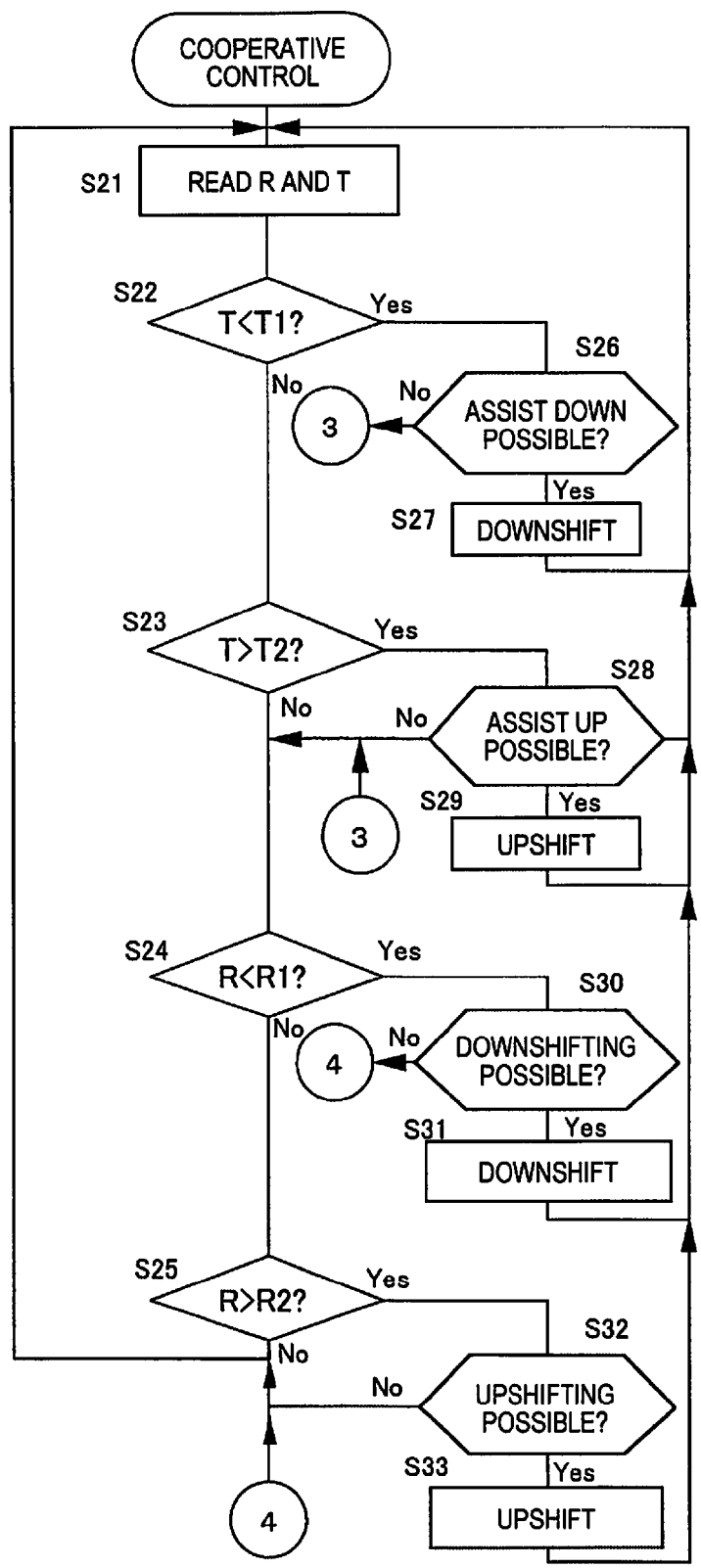
FIG. 6 is a flowchart showing a control operation, similar to FIG. 5, executed by the controller in accordance with a first modification of the first embodiment.

In the first embodiment, shifting (i.e., control of the electric transmission unit 107) was conducted preferentially over the assist control (i.e., control of the driving unit 2); however, in the first modification shown in FIG. 6, the assist control is conducted preferentially over shifting. In the first modification, in step S22 and step S23 in FIG. 6, the controller 4 determines whether or not the manual drive force T is in the prescribed range. Additionally, the controller 4 conducts the process of assist down and the process of assist up individually in step S27 and step S29. Then, when the manual drive force T is in the prescribed range, the controller 4 determines whether or not the crank rotational speed R is in the prescribed range in step S24 and step S25, and the controller 4 conducts the processes of upshifting and downshifting individually in step S31 and step S33. In this way, if the assist control is preferentially conducted, especially in the case of using an interior gearbox and when the pedaling force is greater than the prescribed range, the torque that is applied to the interior gearbox can be made small, so that gear shifting later becomes easier. The other control procedures are the same as the control procedures in FIG. 4 of the first embodiment, so they are shown in FIG. 6 and their explanations have been omitted.

Second Modification of the First Embodiment

In the first embodiment and the first modification, the control put the manual drive force T and the crank rotational speed R in the prescribed range by changing one gear position at a time in the case of shifting and by a prescribed amount (10 percent) at a time in the assist processing. In the second and third modifications, shifting and assist processing are conducted by a calculation according to the pedaling force that is read and the difference between the crank rotational speed R and the prescribed range (for example, the median of the prescribed range). Meanwhile, changes in the manual drive force T per each upshift and downshift for each gear position and the rotational speed R are stored in a computer storage device, such as in a memory. Additionally, the relationship between the changes in the output of the motor 20 or the assist ratio and the changes in the manual drive force T is stored beforehand in a storage means, such as in the memory. Meanwhile, in the second modification shown in FIG. 7, shifting is preferentially processed with respect to assist processing in the same way as the first embodiment.

Figure 7:
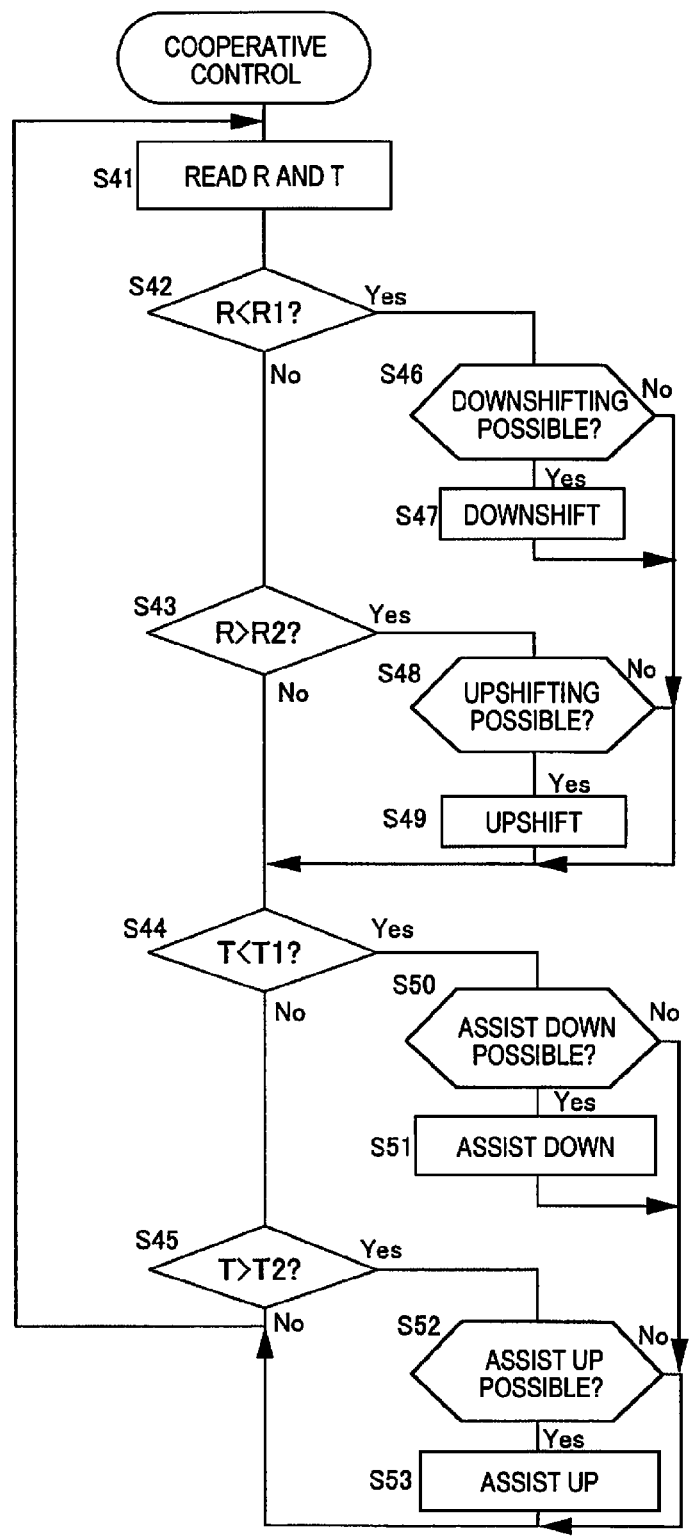
FIG. 7 is a flowchart showing a control operation, similar to FIG. 5, executed by the controller in accordance with a second modification of the first embodiment.

In FIG. 7, in step S41, the controller 4 reads the crank rotational speed R and the manual drive force T from the rotational speed sensor 8 and the torque sensor 50. In step S42, the controller 4 determines whether or not the crank rotational speed R is less than the lower limit rotational speed R1 in the prescribed range. In step S43, the controller 4 determines whether or not the crank rotational speed R exceeds the upper limit rotational speed R2 in the prescribed range. In step S44, the controller 43 determines whether or not the manual drive force T that is read is less than the lower limit manual drive force T1 in the prescribed range. In step S45, the controller 4 determines whether or not the manual drive force T that is read exceeds the upper limit manual drive force T2 in the prescribed range.

Upon the controller 4 determining that the crank rotational speed R is less than the lower limit rotational speed R1, the process proceeds from step S42 to step S46. In step S46, the controller 4 determines whether or not downshifting is possible. This determination is the same as in the first embodiment. If downshifting is possible, then the process proceeds from step S46 to step S47. In step S47, the amount of downshifting is calculated according to the difference between the crank rotational speed R and the crank rotational speed in a middle of the prescribed range ((R1+R2)/2). Then, with the calculation results, the controller 4 outputs an instruction to downshift once or a plurality of times to the gear positions on the low speed side to the electric transmission unit 107. Then, the process proceeds to step S44. With this configuration, the crank rotational speed R is put in the prescribed range. When downshifting is not possible, the crank rotational speed R cannot be put in the prescribed range even if the electric transmission unit 107 is controlled. Therefore, in this situation, the process proceeds from step S46 to step S44 and conducts assist control while maintaining the current gear position. When the crank rotational speed R is greater than or equal to the lower limit rotational speed R1, the process proceeds from step S42 to step S43.

Upon the controller 4 determining that the crank rotational speed R exceeds the upper limit rotational speed R2, the process proceeds from step S43 to step S48. In step S48, the controller 4 determines whether or not upshifting is possible. This determination is the same as in the first embodiment. If upshifting is possible, then the process proceeds from step S48 to step S49. In step S49, the amount of upshifting is calculated according to the difference between the crank rotational speed R and the crank rotational speed in a middle of the prescribed range ((R1+R2)/2). Then, with the calculation results, the controller 4 outputs an instruction to upshift once or a plurality of times to the gear positions on the high-speed side to the electric transmission unit 107. Then, the process proceeds to step S44. With this configuration, the crank rotational speed R is put in the prescribed range. When upshifting is not possible, the crank rotational speed R cannot be put in the prescribed range even if the electric transmission unit 107 is controlled. Therefore, the process proceeds from step S48 to step S44 and conducts assist control while maintaining the current gear position.

Upon the controller 4 determining that the manual drive force T is less than the lower limit manual drive force T1, the process proceeds from step S44 to step S50. In step S10, the controller 4 determines whether or not assist down is possible. This determination is the same as in the first embodiment. If assist down is possible, the process proceeds from step S50 to step S51, and the amount of downshifting is calculated according to the difference between the current manual drive force T that is read and the pedaling force in the middle of the prescribed range ((T1+T2)/2). Then, according to the calculation results, an assist down process is conducted in which the controller 4 outputs an instruction to the inverter part 6 to make the output of the motor 20 lower than the current output of the motor 20 or to make the assist ratio lower than the current assist ratio. Then, the process proceeds to step S41. Upon the controller 4 determining that assist down is not possible, since the manual drive force T cannot be put in the prescribed range even if the driving unit 2 is controlled, the process returns to step S41 and maintains the current assist ratio. When the manual drive force T is greater than or equal to the lower limit manual drive force T1, the process proceeds from step S44 to step S45.

Upon the controller 4 determining that the manual drive force T exceeded the upper limit manual drive force T2, the process proceeds from step S45 to step S52. In step S52, the controller 4 determines whether or not assist up is possible. This determination is the same as in the first embodiment. If assist up is possible, the process proceeds from step S52 to step S53, and the amount of assist up is calculated according to the difference between the current manual drive force T that is read and the pedaling force in the middle of the prescribed range ((T1+T2)/2). Then, according to the calculation results, an assist up process is conducted in which the controller 4 outputs an instruction to the inverter part 6 to make the output of the motor 20 higher than the current output of the motor 20 or to make the assist ratio higher than the current assist ratio. Then, the process proceeds to step S41. Upon the controller 4 determining that assist up is not possible, since the manual drive force T cannot be put in the prescribed range even if the driving unit 2 is controlled, the process returns to step S41 and maintains the current assist ratio.

Third Modification of the First Embodiment

Figure 8:
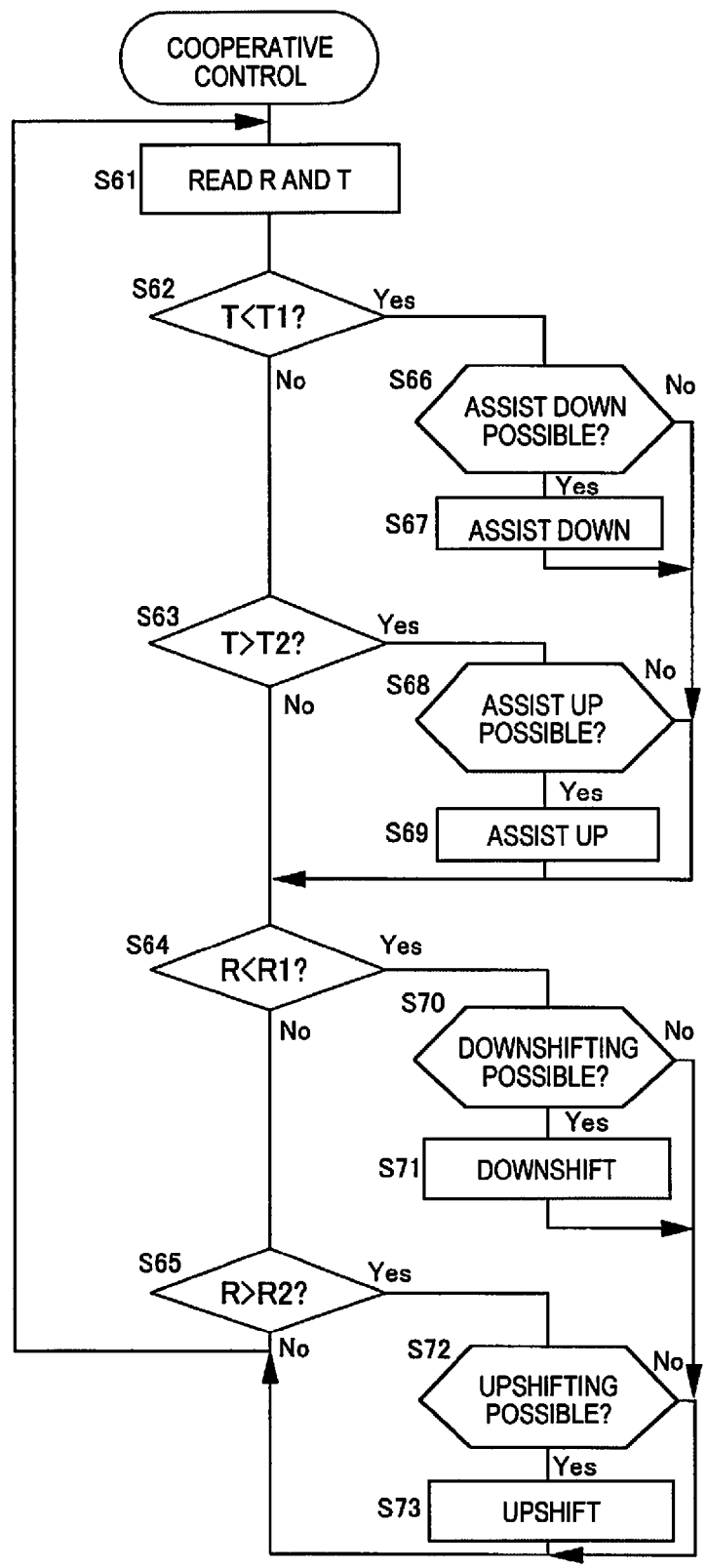
FIG. 8 is a flowchart showing a control operation, similar to FIG. 5, executed by the controller in accordance with a third modification of the first embodiment.

In the second modification, shifting (i.e., control of the electric transmission unit 107) was conducted preferentially over the assist control (i.e., control of the driving unit 2). However, in the third modification shown in FIG. 8, the assist control is conducted preferentially over shifting. In the third modification, in step S62 and step S63 in FIG. 8, the controller 4 determines whether or not the manual drive force T is in the prescribed range. Additionally, the controller 4 conducts the process of assist down and the process of assist up individually in step S67 and step S69 in the same way as in the second modification. Then, when the manual drive force T is in the prescribed range, the controller 4 determines whether or not the crank rotational speed R is in the prescribed range in step S64 and step S65. If this is not in the prescribed range, then the controller 4 conducts the processes of downshifting and upshifting individually in the same way as in the second modification in step S71 and step S73, which are the same as in the second modification. In this way, if the assist control is preferentially conducted, especially in the case of using an interior gearbox and when the pedaling force is greater than the prescribed range, the torque that is applied to the interior gearbox can be made small, so that gear shifting later becomes easier. The other control procedures are the same as the control procedures in FIG. 7 of the second embodiment, so they are shown in FIG. 8, and their explanations have been omitted.

Fourth Modification of the First Embodiment

Figure 9:
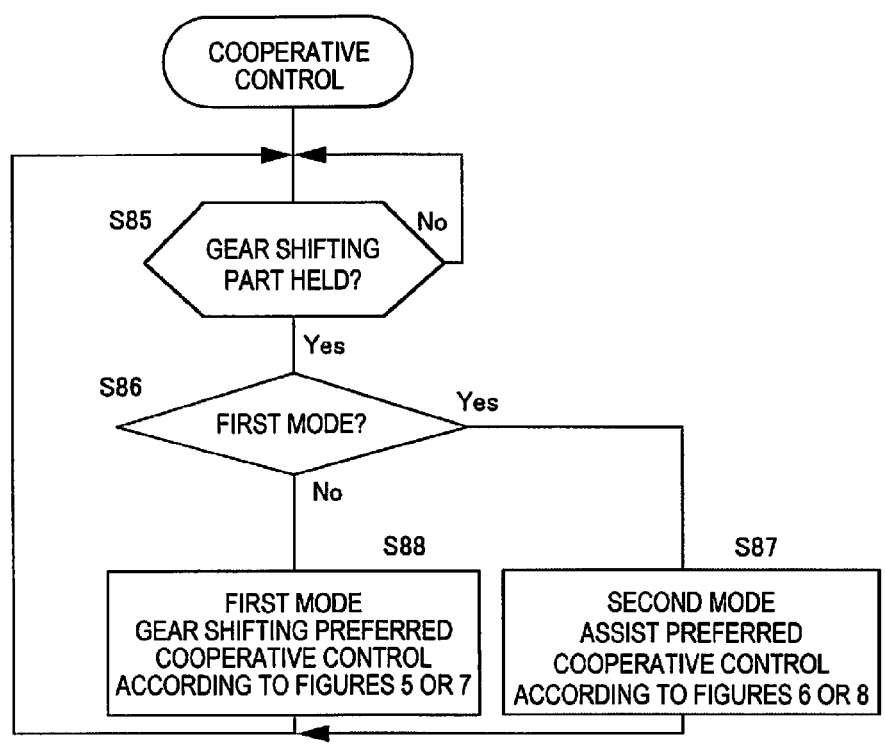
FIG. 9 is a flowchart showing a control operation, similar to FIG. 5, executed by the controller in accordance with a fourth modification of the first embodiment.

In the fourth modification, the configuration is such that a first mode that preferentially conducts shifting and a second mode that preferentially conducts assist control are selectable. In this case, as shown in FIG. 9, in step S85, for example, the configuration is such that the first mode and the second mode are selectable by holding down a switch of the gear shifting part 10, etc. In step S85 in FIG. 9, the controller 4 waits for the switch of the gear shifting part 10 to be held down. When the switch of the gear shifting part 10 is held down, the process proceeds to step S86, and the controller 4 determines whether or not the current control mode is the first mode. If this is the first mode, then the process proceeds from step S86 to step S87, and the controller 4 sets the control mode to the second mode. With this configuration, the cooperative control in which the assist control is preferred, as shown in FIG. 6 or FIG. 8, is executed. If a determination is made that this is not in the first mode, that is, that this is in the second mode, then the process proceeds from step S86 to step S88, and the controller 4 sets the control mode to the first mode. With this configuration, the cooperative control in which the shift control is preferred, as shown in FIG. 5 or FIG. 7, is executed.

In this way, by making the control mode selectable, the manual drive force T and the crank rotational speed R can be changed simultaneously by preferentially controlling the electric transmission unit 107, and power consumption can be suppressed. By preferentially controlling the driving unit 2, the manual drive force T can be suppressed from greatly changing without changing the crank rotational speed R.

Second Embodiment

Figure 10:
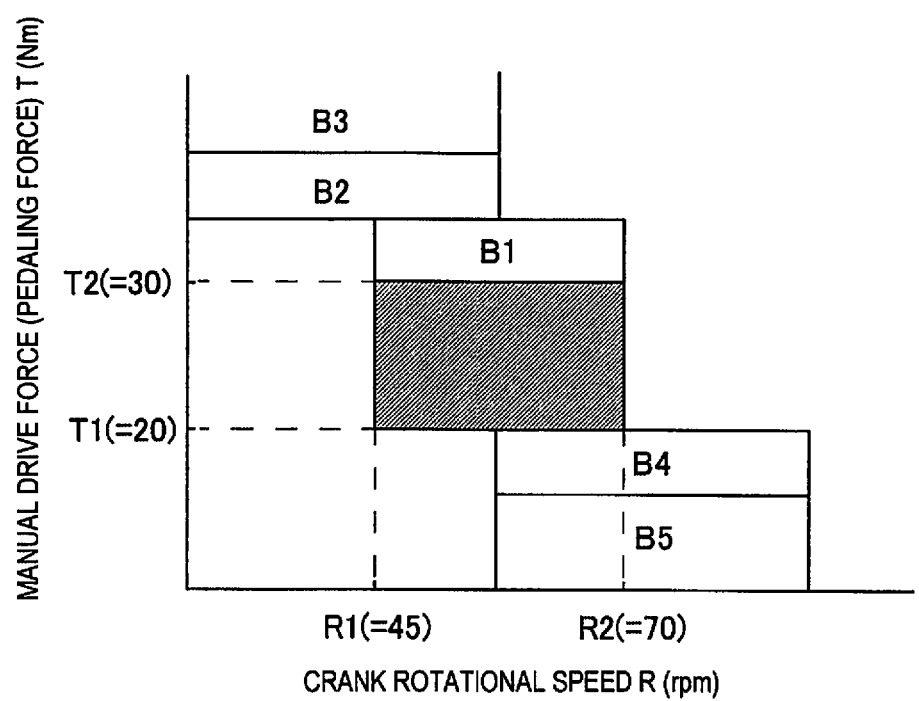
FIG. 10 is a graph showing the operation that converges the manual drive force and the crank rotational speed in which divided ranges are used in accordance with a second embodiment.

In the second embodiment, as shown in FIG. 10, the crank rotational speed R and the manual drive force T are controlled by dividing them into a plurality of ranges, using the prescribed range as the basis. Here, for convenience, the division includes five ranges of a first range B1 to a fifth range B5, but the number of ranges for control and the ranges are not limited to these five ranges.

The first range B1 is a range in which the manual drive force T is greater than the lower limit of the prescribed range by a prescribed amount N1 (for example, 10 Nm) and the crank rotational speed R is in the prescribed range. That is, the first range B1 is a range in which $T2<T\le(T2+N1)$ and $R1\le R\le R2$. The second range B2 is a range in which the manual drive force T is greater than the first range B1 by a prescribed amount N2 (for example, 10 Nm) and the crank rotational speed R is less than the crank rotational speed R in the middle of the prescribed range for the crank rotational speed. That is, the second range B2 is a range in which $(T2+N1)<T\le(T2+N1+N2)$ and $0\le R\le((R1+R2)/2)$. The third range B3 is a range in which the manual drive force T is greater than the second range B2 and the crank rotational speed R is less than the crank rotational speed R in the middle of the prescribed range for the crank rotational speed. That is, the third range B3 is a range in which $T>(T2+N1+N2)$ and $R<((R1+R2)/2)$. The fourth range B4 is a range in which the manual drive force T is less than the lower limit of the prescribed range by a prescribed amount N3 (for example, 10 Nm) and the crank rotational speed R is greater than the crank rotational speed R in the middle of the prescribed range for the crank rotational speed. That is, the fourth range B4 is a range in which $(T1-N3)\le T<T1$ and $R>((R1+R2)/2)$. The fifth range B5 is a range in which the manual drive force T is less than the fourth range B4 and the crank rotational speed R is greater than the crank rotational speed R in the middle of the prescribed range for the crank rotational speed. That is, the fifth range B5 is a range in which $T<(T1-N3)$ and $R>((R1+R2)/2)$.

Next, the control operation of the controller 4 of the second embodiment will be explained based on the flowchart shown in FIG. 11.

Figure 11:
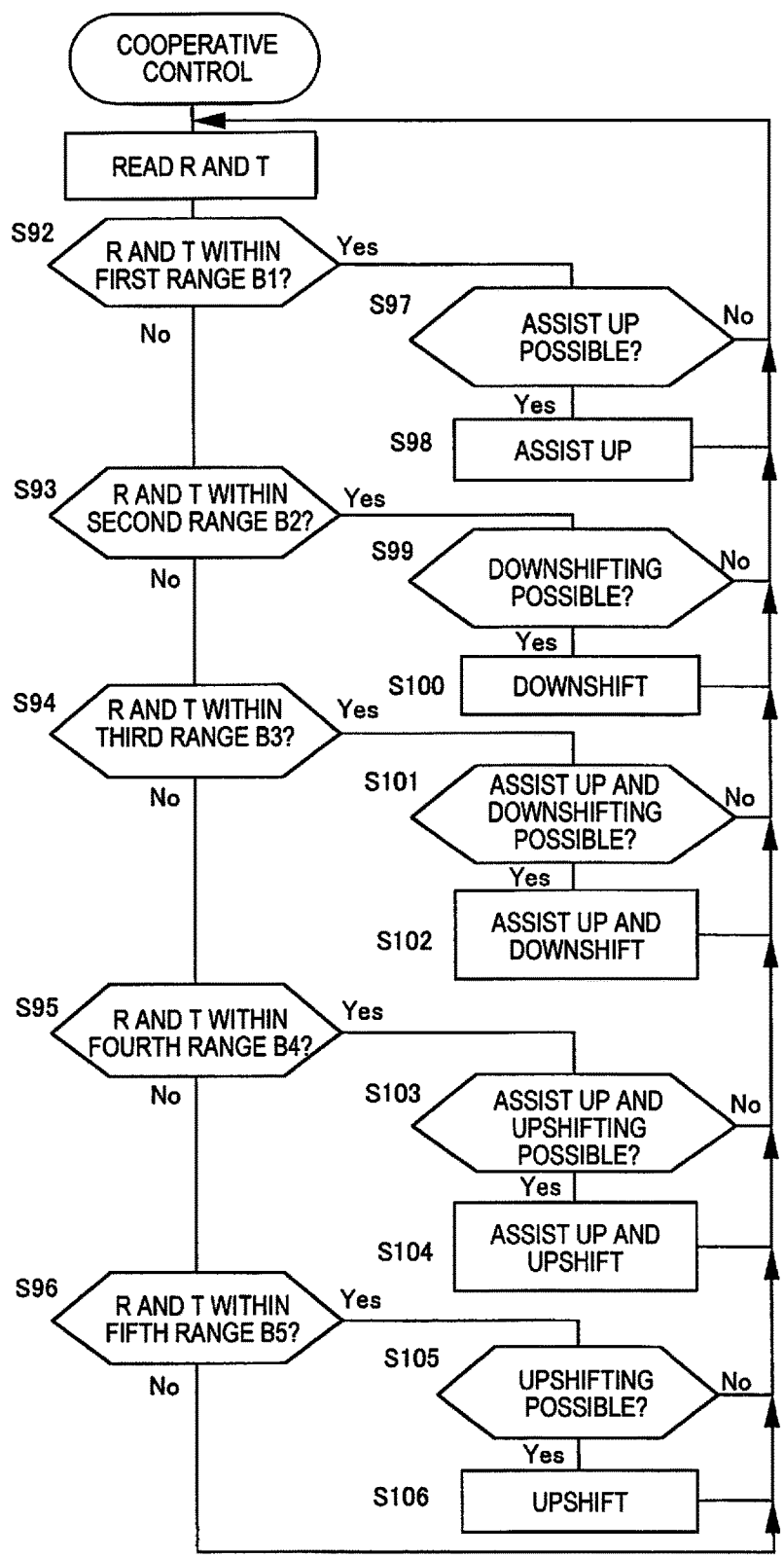
FIG. 11 is a flowchart showing a control operation, similar to FIG. 5, executed by the controller in accordance with a second embodiment that converges the manual drive force and the crank rotational speed to the prescribed range.

In step S91 in FIG. 11, the controller 4 reads the crank rotational speed R and the manual drive force T from the rotational speed sensor 8 and the torque sensor 50. In step S92, the controller 4 determines whether or not the crank rotational speed R and the manual drive force T are in the first range B1. In step S93, the controller 4 determines whether or not the crank rotational speed R and the manual drive force T are in the second range B2. In step S94, the controller 4 determines whether or not the crank rotational speed R and the manual drive force T are in the third range B3. In step S95, the controller 4 determines whether or not the crank rotational speed R and the manual drive force T are in the fourth range B4. In step S96, the controller 4 determines whether or not the crank rotational speed R and the manual drive force T are in the fifth range B5.

Upon the controller 4 determining that the crank rotational speed R and the manual drive force T are in the first range B1, then the process proceeds from step S42 to step S97. The first range B1 is a range that is the same as the prescribed range with respect to the prescribed range of the crank rotational speed R, and that is greater than the prescribed range with respect to the prescribed range of the manual drive force T. For this reason, if the manual drive force T is decreased by an assist up control, the manual drive force T can likely be contained in the prescribed range. In step S97, the controller 4 determines whether or not assist up that decreases the manual drive force T is possible. This determination is the same as step S12 in FIG. 5 of the first embodiment. If a determination is made that assist up is possible, the process proceeds from step S97 to step S98, and an assist up process is conducted, in which the controller 4 outputs an instruction to increase the assist ratio to the inverter part 6; then, the process proceeds to step S91.

Upon the controller 4 determining that the crank rotational speed R and the manual drive force T are in the second range B2, then the process proceeds from step S93 to step S99. The second range B2 is a range that is less than the median crank rotational speed of the prescribed range ((R1+R2)/2), and in which the manual drive force T (i.e., the pedaling force) is greater than the first range B1. For this reason, by reducing the manual drive force T and increasing the crank rotational speed R simultaneously through downshifting, the manual drive force T can likely be contained in the prescribed range. For this reason, in step S99, the controller 4 determines whether or not downshifting is possible. This determination is the same as in step S6 in FIG. 5 of the first embodiment. Upon the controller 4 determining that downshifting is possible, the process proceeds from step S99 to step S100, and downshifting to a gear position that is one step on the low-speed side than the current gear position is conducted; then, the process proceeds to step S91.

Upon the controller 4 determining that the crank rotational speed R and the manual drive force T are in the third range B3, then the process proceeds from step S94 to step S101. The third range B3 is a range that is less than the median crank rotational speed of the prescribed range ((R1+R2)/2), and in which the manual drive force T (i.e., the pedaling force) is greater than the second range B2. For this reason, containing the manual drive force T and the crank rotational speed R in the prescribed range by just reducing the manual drive force T and increasing the crank rotational speed R simultaneously through downshifting is difficult. Therefore, the two processes of downshifting and assist up control are carried out. In step S101, a determination is made regarding whether or not downshifting and assist up are possible. This determination is the same as in step S7 and step S12 in FIG. 5 of the first embodiment. Upon the controller 4 determining that upshifting is possible, the process proceeds from step S101 to step S102, and downshifting to a gear position that is one step on the low-speed side than the current gear position is conducted; at the same time an assist up process to increase the assist ratio is conducted, and the process proceeds to step S91.

Upon the controller 4 determining that the crank rotational speed R and the manual drive force T are in the fourth range B4, then the process proceeds from step S95 to step S103. The fourth range B4 is a range that is greater than the median crank rotational speed of the prescribed range ((R1+R2)/2), and in which the manual drive force T (i.e., the pedaling force) is less than the prescribed range. In this way, since the manual drive force T is near the prescribed range, if the increase of the manual drive force T and the decrease of the crank rotational speed R are simultaneously conducted through upshifting, there is the risk that the manual drive force T will become larger than the prescribed range. For this reason, the controller 4 carries out two processes of upshifting and assist up control. In step S103, the controller 4 determines whether or not upshifting and assist up are possible. This determination is the same as step S8 and step S12 in FIG. 5 of the first embodiment. If a determination is made that upshifting and assist up are possible, the process proceeds from step S103 to step S104, and upshifting to a gear position that is one step on the high-speed side than the current gear position is conducted; at the same time, an assist up process to increase the assist ratio is conducted, and the process proceeds to step S91.

If a determination is made that the crank rotational speed R and the manual drive force T are in the fifth range B5, then the process proceeds from step S96 to step S105. The fifth range B5 is a range that is greater than the median crank rotational speed of the prescribed range ((R1+R2)/2), and in which the manual drive force T (i.e., the pedaling force) is greater than the fourth range B4. In this way, since the manual drive force T is a little off of the prescribed range, if the increase of the manual drive force T and the decrease of the crank rotational speed R are simultaneously conducted through upshifting, the manual drive force T is likely to be contained in the prescribed range. For this reason, only upshifting is conducted. In step S105, a determination is made regarding whether or not upshifting is possible. This determination is the same as in step S8 in FIG. 5 of the first embodiment. If the controller 4 determines that upshifting is possible, the process proceeds from step S105 to step S106, and upshifting to a gear position that is one step on the high-speed side than the current gear position is conducted; then, the process proceeds to step S91.

Here, the manual drive force T and the crank rotational speed R are divided into a plurality of ranges (for example, from the first range B1 to the fifth range B5), and at least one of the electric transmission unit 107 and the driving unit 2 is controlled. For this reason, the contents of the control can be set per each range, and the control can be simplified.

Third Embodiment

In the third embodiment, the process of setting and changing the prescribed range is conducted.

Figure 12:
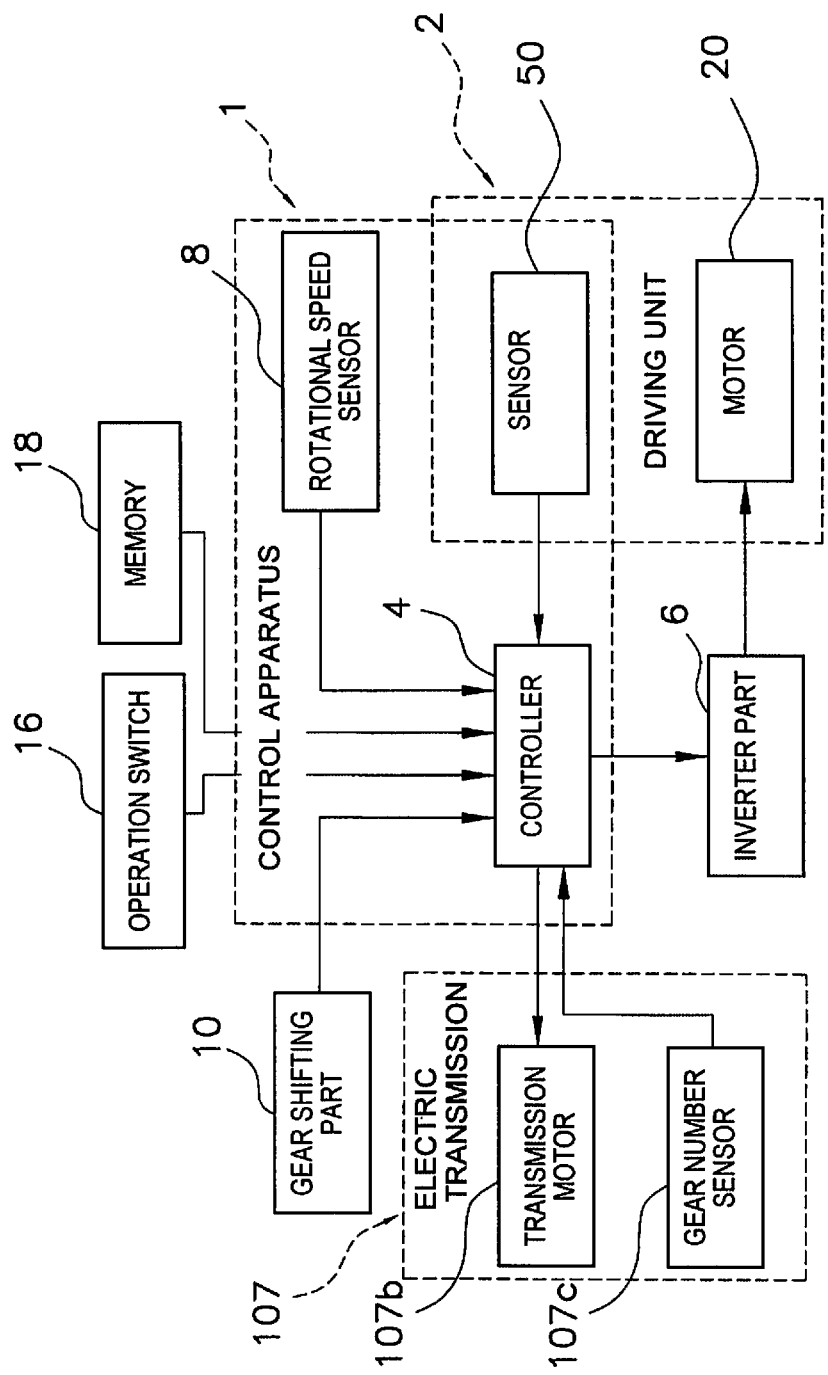
FIG. 12 is a block diagram showing a configuration of a bicycle control apparatus including a driving unit in accordance with a third embodiment.

FIG. 12 is a block diagram showing the configuration of the electric power and electricity of a power-assisted bicycle including the driving unit 2 for carrying out the third embodiment. In FIG. 12, an operation switch 16 and a memory 18 are added to the configuration of the power-assisted bicycle as shown in FIG. 3. The operation switch 16 is an operation part used for setting or changing the prescribed range. Meanwhile, instead of the operation switch 16, the setting or changing operation of the prescribed range can be conducted by an operation that is different (for example, holding down or double-clicking) from the normal operation used for shifting the gear shifting part 10. The memory 18 is installed in order to store the detected value of the rotational speed sensor 8 (the rotation parameter) and the detected value of the torque sensor 50 (the manual drive force). For example, the controller 4 stores M detected values detected at a prescribed time interval in order from the most recent one (for example, M is an integer from 5 to 50) on the memory 18. The other configurations are the same as the first embodiment, and their explanations have been omitted.

In the present embodiment, the prescribed range of the first embodiment as shown in FIG. 4 is set or changed according to at least one of the detected value of the rotational speed sensor 8 (the rotation parameter R) and the detected value of the torque sensor 50 (the manual drive force T). As an example, in the third embodiment as shown in FIG. 13, a center value AP of the prescribed range is determined and the prescribed range is set or changed, according to the manual drive force T that is read and the rotation parameter R, after or before the operation switch 16 being operated.

Figure 13:
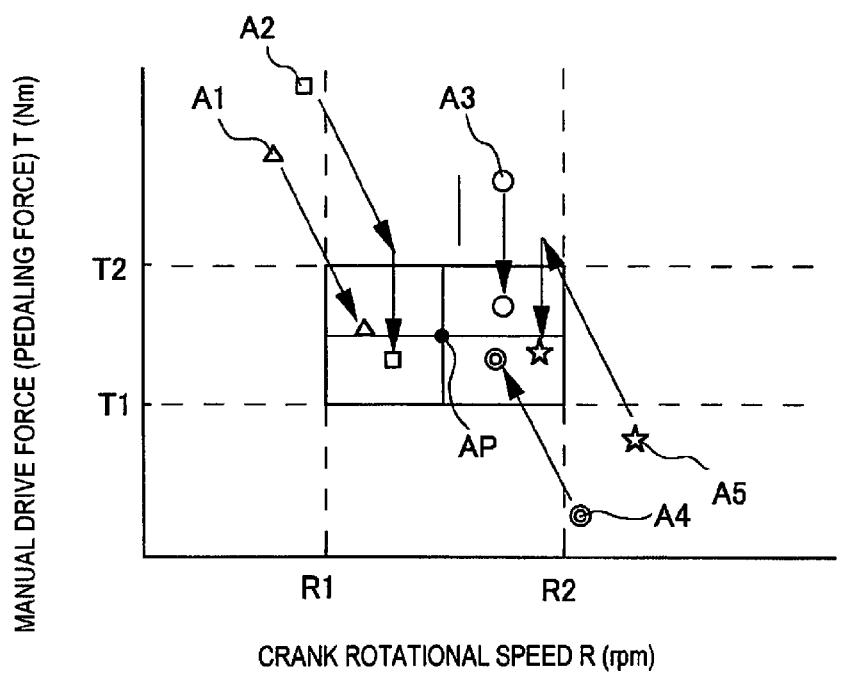
FIG. 13 is a graph, similar to FIG. 4, showing the operation that converges the manual drive force and the crank rotational speed to the prescribed range in accordance with the third embodiment.
Figure 14:
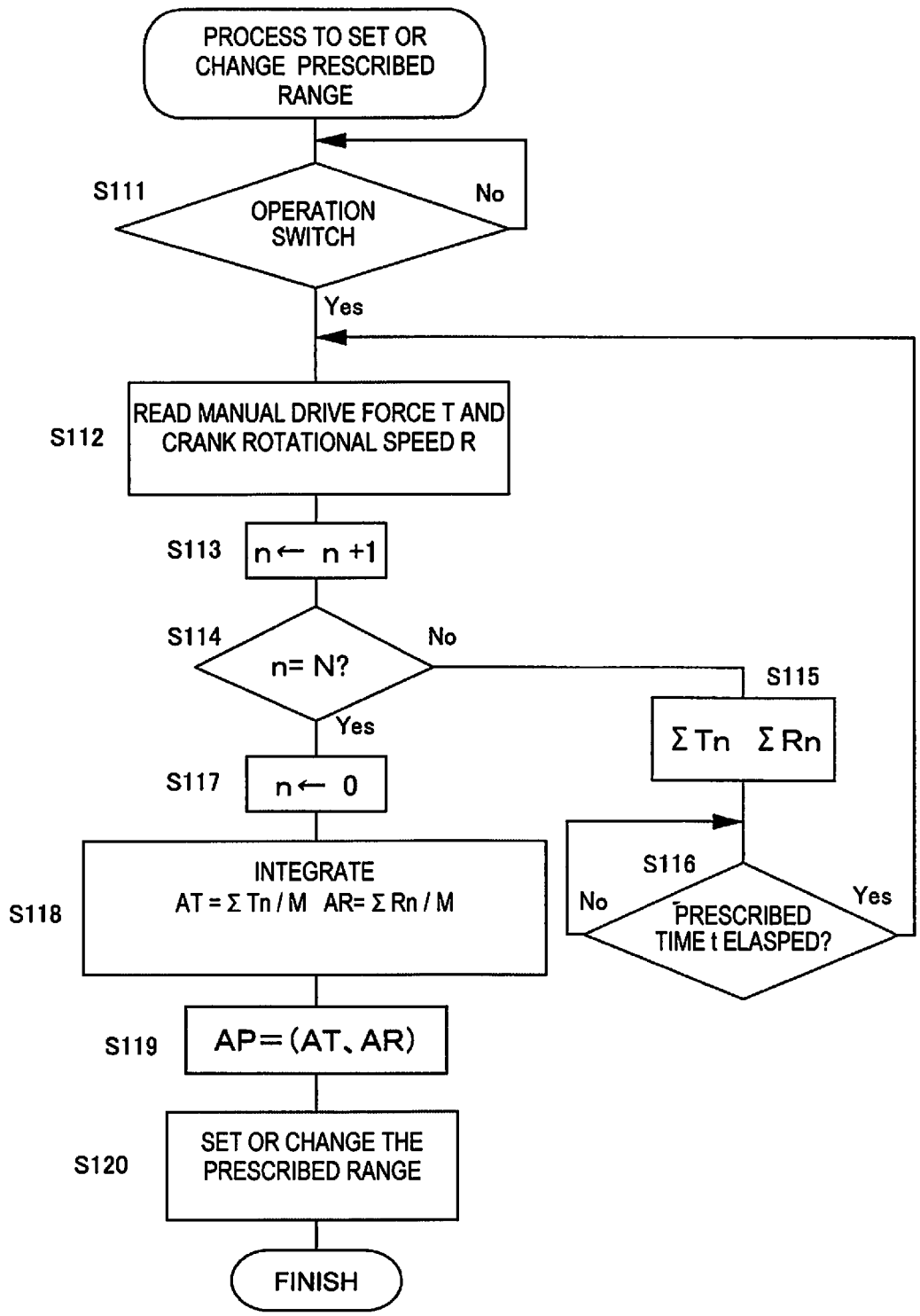
FIG. 14 is a flowchart showing a control operation executed by the controller for setting or changing the prescribed range in accordance with the third embodiment.

Next, the control operation of setting or changing the prescribed range as shown in FIG. 13 will be explained based on the flowchart shown in FIG. 14. Meanwhile, FIG. 14 is one example of the control operation, and the present invention is not limited by the control operation shown in FIG. 14. Additionally, regarding setting or changing of the prescribed range, setting of the prescribed range means determining the prescribed range at the beginning, and changing of the prescribed range means changing the determined prescribed range.

In step S111 in FIG. 14, the controller 4 waits for the operation switch 16 to be operated. When the operation switch 16 is operated, the controller 4 proceeds with the process from step S111 to step S112. In step S112, the controller 4 reads the manual drive force T of the torque sensor 50 and the rotation parameter (the crank rotational speed R) of the rotational speed sensor 8. Then, the process proceeds to step S113. In step S113, the controller 4 increases by 1 the number of detection times n that the values of the manual drive force T and the crank rotational speed R are read in. Then, the process proceeds to step S114. In step S114, the controller 4 determines whether or not the number of detection times n is equaled to a specified number N (for example, N is an integer from 5 to 20). If a determination is made that the number n is not the specified number N, the controller 4 proceeds with the process to step S115. In step S115, the controller 4 integrates the manual drive force T that has been read so far and the crank rotational speed R, proceeds with the process to step S116, and awaits a lapse of a prescribed time t. The prescribed time t is, for example, a time between one second and one minute. When the prescribed time t elapses, the controller 4 proceeds with the process to step S112 and reads the manual drive force T and the crank rotational speed R at the next timing.

If a determination is made that the number of detection times n has reached the specified number N, then the controller 4 proceeds with the process from step S114 to step S117. In step S117, the controller 4 resets the number of detection times n to "0"; then, the process proceeds to step S118. In step S118, the controller 4 divides integrated values of the N manual drive forces T that are read and the crank rotational speeds R ($\Sigma T_n$, $\Sigma R_n$) by the number of times N, and calculates average values of the manual drive force T and the crank rotational speed R ($AT=\Sigma T_n/N$, $AR=\Sigma R_n/N$). Then, the controller 4 proceeds with the process to step S119, sets the calculated average values (AT, AR) to be the center value AP of the prescribed range (FIG. 13), and proceeds with the process to step S120. In step S120, the prescribed range is set or changed, and setting or changing of the prescribed range is completed. Specifically, the average values of the detected manual drive force T and the rotation parameter R (AT, AR) are set to be the center value AP of the prescribed range (FIG. 13), and a new prescribed range is set or changed by adding half values of the upper limit values (T2, R2) and the lower limit values (T1, R1) of the prescribed range ((T2−T1)/2), (R2−R1)/2) to the center value AP and by subtracting the half values of the upper limit values (T2, R2) and the lower limit values (T1, R1) of the prescribed range ((T2−T1)/2), (R2−R1)/2) from the center value AP. With this configuration, the prescribed range can be set or changed according to the condition of the rider (the physical condition, the level of fatigue, etc.) and the condition of the traveling path (for example, the degree of slope of the traveling path, the road surface condition of the traveling path (for example, tarmac or gravel)).

First Modification of the Third Embodiment

Figure 15:
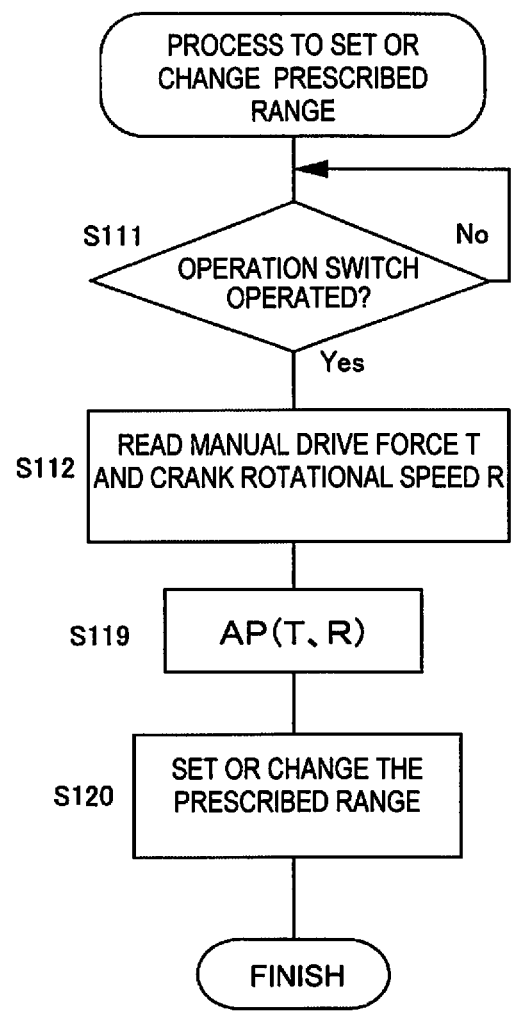
FIG. 15 is a flowchart showing a control operation executed by the controller for setting or changing the prescribed range accordance with a first modification of the third embodiment.

In the first modification of the third embodiment, as shown in FIG. 15, the prescribed range is set or changed according to the manual drive force T and the crank rotational speed R after the operation switch 16 being operated. In FIG. 15, the controller 4 sequentially executes the process of step S111, step S112, step S119 and step S120, as shown in FIG. 14. Meanwhile, in step S119, as the center value AP of the prescribed range, the manual drive force T that is read and the crank rotational speed R, not the average values, are used as they are (AP=(T, R)).

Second Modification of the Third Embodiment

Figure 16:
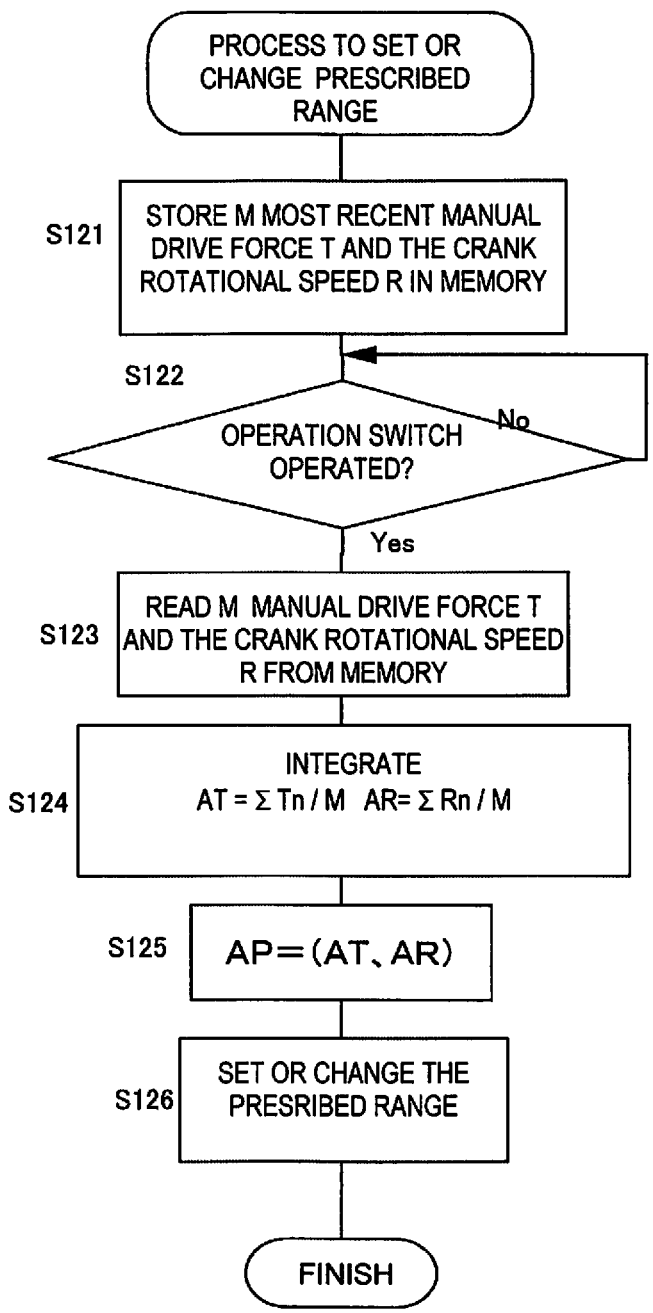
FIG. 16 is a flowchart showing a control operation executed by the controller for setting or changing the prescribed range accordance with a second modification of the third embodiment.

In the second modification of the third embodiment, the controller 4 stores the manual drive force T that is read and the crank rotational speed R on the memory 18, and sets or changes the prescribed range according to the stored manual drive force T and the crank rotational speed R when the operation switch 16 is operated. In FIG. 16, the controller 4 stores the M manual drive forces T that are read most recently and the crank rotational speeds R on the memory 18, and sets or changes the prescribed range according to the average values of the M stored manual drive forces T and the crank rotational speeds R (AT, AR).

In step S121 in FIG. 16, the controller 4 stores the M most recent manual drive force T and the crank rotational speed R in the memory 18. Then, the process proceeds to step S122. In step S122, the controller 4 waits for the operation switch 16 to be operated. When the operation switch 16 is operated, the controller 4 proceeds with the process from step S122 to step S123. In step S123, the controller 4 reads out the M manual drive forces T and the crank rotational speeds R stored in the memory 18; then, the process proceeds from step S123 to step S124. In step S124, the controller 4 integrates the manual drive forces T and the crank rotational speeds R that are read out from the memory 18, divides the integrated values of the manual drive forces T and the crank rotational speeds R ($\Sigma T_n$, $\Sigma R_a$) by the number M, and calculates the average values of the manual drive force T and the crank rotational speed R (AT=$\Sigma T_n$/M, AR=$\Sigma R_n$/M). Then, the controller 4 proceeds with the process to step S125, sets the calculated average values (AT, AR) to be the center value AP of the prescribed range (FIG. 13), and proceeds with the process to step S126. In step S126, the prescribed range is set or changed so that the calculated average values (AT, AR) will be the center value AP of the prescribed range (FIG. 13), and setting or changing of the prescribed range is completed. The specific process of step S126 is essentially the same as step S120.

Here, since the prescribed range can be set or changed according to the average values of the M most recent manual drive forces T and the crank rotational speeds R that are stored beforehand on the memory 18, the prescribed range can be set or changed quickly once the operation switch 16 is operated.

Meanwhile, in the second modification, the controller 4 can set or change the prescribed range according to the manual drive forces T and the crank rotational speeds R that are most recently stored, instead of the average values.

Fourth Embodiment

Figure 17:
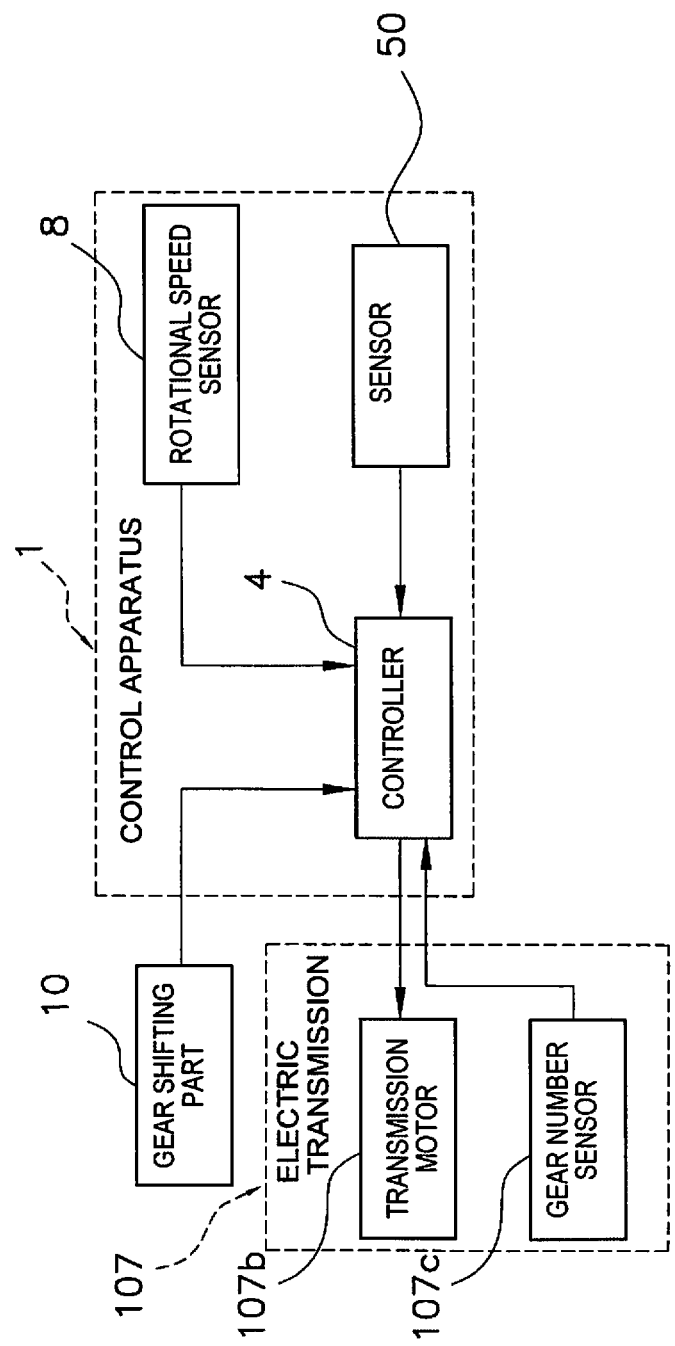
FIG. 17 is a block diagram showing a configuration of a bicycle control apparatus in accordance with a fourth embodiment.
Figure 18:
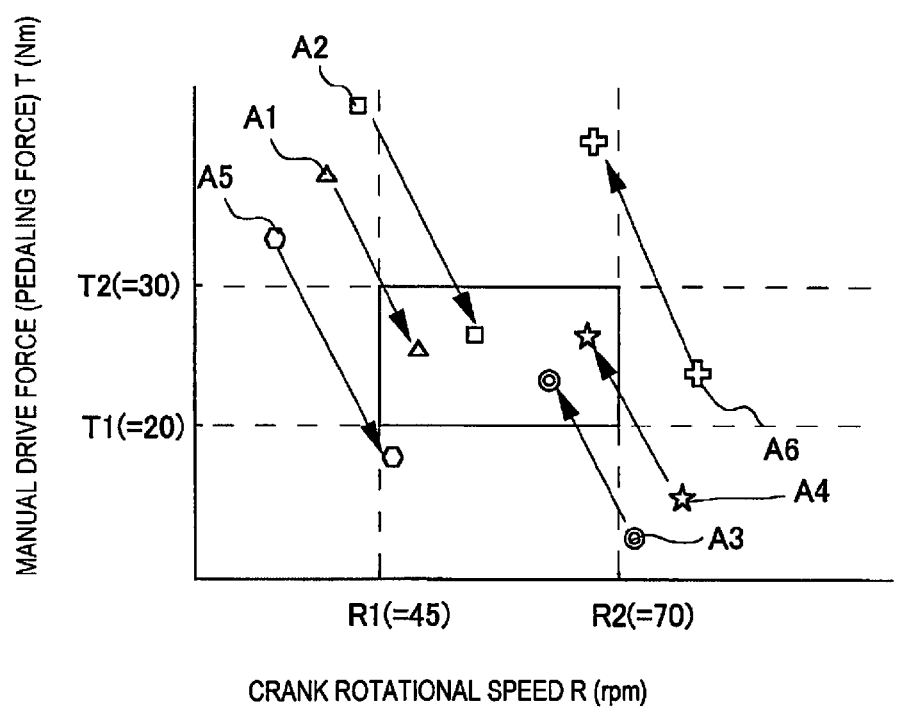
FIG. 18 is a graph showing the operation that converges the manual drive force and the crank rotational speed to the prescribed range in accordance with the fourth embodiment.

In the fourth embodiment as shown in FIG. 17, the driving unit 2 and the inverter part 6 are not installed. The torque sensor 50 that detects the manual drive force is installed, for example, in the periphery of the crank axle. The other configurations are the same as the first embodiment. Therefore, the controller 4 controls the electric transmission unit 107 so that the manual drive force T and the crank rotational speed R will be within the prescribed range, as shown in FIG. 18. However, since the driving unit is not installed, when the electric transmission unit 107 is downshifted or upshifted, the crank rotational speed R and the manual drive force T change simultaneously. Specifically, when the electric transmission unit 107 is downshifted, the crank rotational speed R will be faster and the manual drive force T will be smaller. Also, when the electric transmission unit 107 is upshifted, conversely, the crank rotational speed R will be slower and the manual drive force T will be greater.

Therefore, as is evident from FIG. 18, in the combination of the current manual drive force T and the crank rotational speed R, as in A5 and A6, there are cases where the crank rotational speed R cannot be put within the prescribed range even after a shift control, when the crank rotational speed R is far off of the prescribed range. In this case, the manual drive force T can be preferentially controlled so that the manual drive force will be within the prescribed range.

Figure 19:
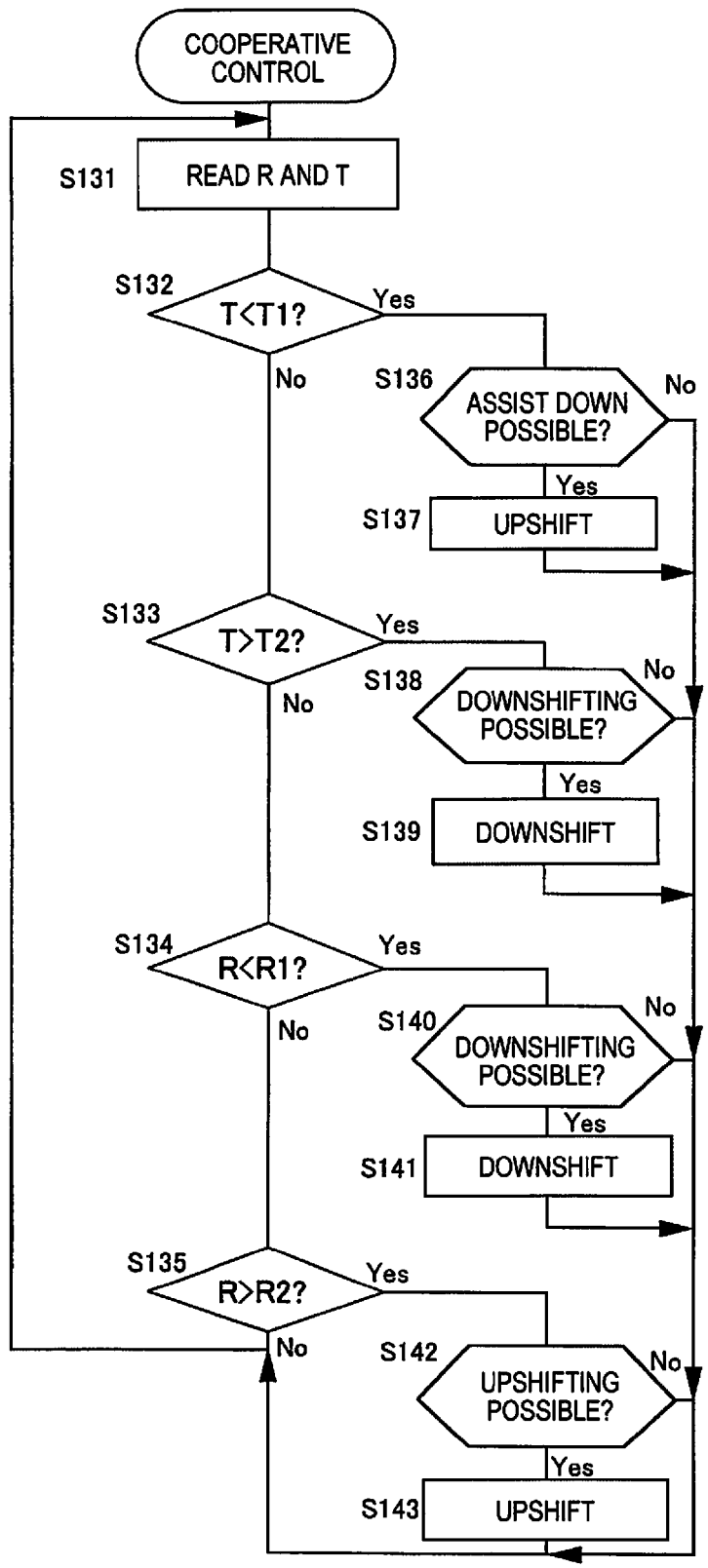
FIG. 19 is a flowchart showing a control operation, similar to FIG. 5, executed by the controller in accordance with a fourth embodiment that converges the manual drive force and the crank rotational speed to the prescribed range.

In step S131 in FIG. 19, the controller 4 reads the crank rotational speed R and the manual drive force T from the rotational speed sensor 8 and the torque sensor 50. In step S132, the controller 4 determines whether or not the manual drive force T that is read is less than the lower limit manual drive force T1 in the prescribed range. In step S133, the controller 4 determines whether or not the manual drive force T that is read exceeds the upper limit manual drive force T2 in the prescribed range. In step S134, the controller 4 determines whether or not the crank rotational speed R is less than the lower limit rotational speed R1 in the prescribed range. In step S135, the controller 4 determines whether or not the crank rotational speed R exceeds the upper limit rotational speed R2 in the prescribed range.

Upon the controller 4 determining that the manual drive force T is less than the lower limit manual drive force T1, the controller 4 proceeds with the process from step S132 to step S136. In step S136, the controller 4 determines whether or not upshifting is possible. This determination is made by the controller 4 by reading data from the gear number sensor 107c. For example, when the gear position is at the highest gear (the gear position at which the gear ratio is the largest), this determination will be "No." If upshifting is possible, then the controller 4 proceeds with the process from step S136 to step S137 and outputs an instruction to the electric transmission unit 107 to upshift toward a gear position that is one step on the high speed side than the current gear position. Then, the process proceeds to step S131. In step S131, the controller 4 reads the crank rotational speed R and the manual drive force T in the next control cycle. Additionally, when upshifting is not possible, the crank rotational speed R cannot be put in the prescribed range even if the electric transmission unit 107 is controlled; therefore, the process proceeds to step S131 and the current gear position is maintained.

Upon the controller 4 determining that the manual drive force T exceeds the upper limit manual drive force T2, the process proceeds from step S133 to step S138. In step S138, the controller 4 determines whether or not downshifting is possible. This determination is made by reading data from the gear number sensor 107c, as in the case with upshifting. For example, when the gear position is at the lowest gear (the gear position at which the gear ratio is the smallest), this determination will be "No." If it is possible to downshift, the controller 4 proceeds with the process from step S138 to step S139 and outputs an instruction to downshift toward a gear position that is one step on the low speed side than the current gear position to the electric transmission unit 107. Then, the process proceeds to step S131. In step S131, the controller 4 reads the crank rotational speed R and the manual drive force T in the next control cycle. Additionally, when downshifting is not possible, the crank rotational speed R cannot be put in the prescribed range even if the electric transmission unit 107 is controlled; therefore, the process proceeds to step S131 and the current gear position is maintained.

Upon the controller 4 determining that the crank rotational speed R is less than the lower limit rotational speed R1, the process proceeds from step S134 to step S140. In step S140, the controller 4 determines whether or not downshifting is possible. This determination is the same as above. If it is possible to downshift, the controller 4 proceeds with the process from step S140 to step S141 and outputs an instruction to downshift toward a gear position that is one step on the low speed side than the current gear position to the electric transmission unit 107; then, the process proceeds to step S131. Additionally, upon the controller 4 determining that downshifting is not possible, the process proceeds to step S131 and the current gear position is maintained.

Upon the controller 4 determining that the crank rotational speed R exceeds the upper limit rotational speed R2, the process proceeds from step S135 to step S142. In step S142, the controller 4 determines whether or not upshifting is possible. This determination is the same as above. If upshifting is possible, the controller 4 proceeds with the process from step S142 to step S143 and outputs an instruction to upshift toward a gear position that is one step on the high speed side than the current gear position to the electric transmission unit 107; then, the process proceeds to step S131. Additionally, when upshifting is not possible, the crank rotational speed R cannot be put in the prescribed range even if the electric transmission unit 107 is controlled; therefore, the process proceeds to step S131 and the current gear position is maintained.

In this way, in the fourth embodiment, the crank rotational speed R and the manual drive force T are detected and controlled so that the manual drive force T and the crank rotational speed R are put in the prescribed range by a shift control. With this configuration, power consumption can be suppressed. Additionally, since the gearbox is controlled so that the crank rotational speed R and the manual drive force T are in the prescribed range, fluctuation in the pedaling power of the rider can be suppressed.

Other Embodiments

A plurality of embodiments of the present invention was described above, but the present invention is not limited to the above-described embodiment; various modifications can be made without departing from the scope of the invention. Specifically, the various embodiments and modifications described in the present Specification can be freely combined according to necessity.

(a) In the above-described embodiment, an example was explained in which the crank rotational speed R, which is the rotational speed of the crank axle 102, was used as the rotation parameter relating to the rotation of the crank axle 102. However, the present invention is not limited to this configuration. For example, when the gear position of the gearbox can be detected as in the above-described embodiment, the rotation parameter can be set based on the speed of the bicycle, the gear position, and the circumference of the tire or based on the rotational speed of the wheel and the gear position.

(b) In the above-described embodiment, an example was explained in which the manual drive force T obtained from the torque that combines the output of the motor 20 detected by the torque sensor 50 and the torque of the crank axle 102 and the output of the motor 20 was used as the manual drive force. However, the present invention is not limited to this configuration. For example, regarding the manual drive force T, the manual drive force T can be obtained by directly detecting the torsion of the crank axle 102, the stretch of the chain 104, the strain of the front sprocket 103, and the bend of the crank arm 101a (or crank arm 101b), etc.

(c) In the above-described embodiment, the prescribed range was set to a range that is preferable for a general rider. However, the present invention is not limited to this configuration. For example, if there is a desire to increase the exercise load, the manual drive force T and the crank rotational speed R of the prescribed range can be increased. Additionally, if there is a desire to decrease the exercise load, the manual drive force T and the crank rotational speed R of the prescribed range can be decreased.

(d) In the above-described fourth embodiment, when the crank rotational speed R and the manual drive force T cannot be put within the prescribed range even after upshifting and downshifting, the manual drive force T was preferentially controlled so that the manual drive force will be within the prescribed range. However, the present invention is not limited to this configuration. For example, the crank rotational speed R can be preferentially controlled so that the crank rotational speed R will be within the prescribed range.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments as recited in the present invention are provided for illustration only, and not for the purpose of limiting the invention as defined by the appended claims and their equivalents.

What is claimed is:

1. A bicycle control apparatus comprising:
a manual drive force detecting device that detects a manual drive force;
a rotation state detection device that detects a parameter relating to crankshaft rotation of a crankshaft; and
a controller programmed to control an output of power assisted to a bicycle user by controlling at least one of a driving unit that generates an auxiliary drive force and an electric transmission unit so that the manual drive force and the parameter relating to the crankshaft rotation will both be within a prescribed range of a preset relationship between a crankshaft rotational speed and the manual drive force applied to the crankshaft.

2. The bicycle control apparatus as recited in claim 1, wherein
the controller is programmed to include
a first mode that preferentially controls the electric transmission unit, and
a second mode that preferentially controls the driving unit.

3. The bicycle control apparatus as recited in claim 1, wherein
the controller is programmed to control the driving unit after controlling the electric transmission unit.

4. The bicycle control apparatus as recited in claim 1, further comprising
a gear sensor configured to detect a gear shift position of the electric transmission unit, the controller being programmed to control the electric transmission unit to a smaller gear ratio based on the gear shift position detected by the gear sensor upon determining that the parameter relating to the crankshaft rotation is less than the prescribed range.

5. The bicycle control apparatus as recited in claim 1, further comprising
a gear sensor configured to detect a gear shift position of the electric transmission unit, the controller being programmed to control the electric transmission unit to a larger gear ratio based on the gear shift position detected by the gear sensor upon determining that the parameter relating to the crankshaft rotation is greater than the prescribed range.

6. The bicycle control apparatus as recited in claim 1, wherein
the controller is programmed to increase the auxiliary drive force upon determining that the manual drive force is greater than the prescribed range.

7. The bicycle control apparatus as recited in claim 1, wherein
the controller is programmed to decrease the auxiliary drive force upon determining that the manual drive force is less than the prescribed range.

8. The bicycle control apparatus as recited in claim 1, wherein
the controller is programmed to control both the driving unit and the electric transmission unit so that a current gear ratio and the auxiliary drive force are maintained upon determining that the manual drive force and the parameter relating to the crankshaft rotation are not in the prescribed range even while both the driving unit and the electric transmission unit are controlled.

9. A bicycle control apparatus comprising:
a manual drive force detecting device that detects a manual drive force;
a rotation state detection device that detects a parameter relating to crankshaft rotation of a crankshaft; and
a controller programmed to control at least one of a driving unit that generates an auxiliary drive force and an electric transmission unit so that the manual drive force and the parameter relating to the crankshaft rotation will be within a prescribed range, the controller being further programmed to increase the auxiliary drive force upon determining that the manual drive force is greater than the prescribed range and the parameter relating to the crankshaft rotation is in a first range that is within the prescribed range.

10. The bicycle control apparatus as recited in claim 9, wherein
the controller is programmed to control the electric transmission unit to a smaller gear ratio upon determining that the manual drive force is greater than the first range and the parameter relating to the crankshaft rotation is in a second range that is less than a middle of the prescribed range.

11. The bicycle control apparatus as recited in claim 10, wherein
the controller is programmed to control the electric transmission unit to a smaller gear ratio and increase the auxiliary drive force upon determining that the manual drive force is greater than the second range and the parameter relating to the crankshaft rotation is in a third range that is less than the middle of the prescribed range.

12. The bicycle control apparatus as recited in claim 9, wherein
the controller is programmed to control the electric transmission unit to a larger gear ratio and increase the auxiliary drive force when the manual drive force is less than the prescribed range and the parameter relating to the crankshaft rotation is in a fourth range that is greater than the middle of the prescribed range.

13. The bicycle control apparatus as recited in claim 12, wherein
the controller is programmed to control the electric transmission unit to a smaller gear ratio upon determining that the manual drive force is less than the fourth range and the parameter relating to the crankshaft rotation is in a fifth range that is greater than the middle of the prescribed range.

14. The bicycle control apparatus as recited in claim 1, wherein
the manual drive force detecting device detects crankshaft torque as the manual drive force.

15. The bicycle control apparatus as recited in claim 1, wherein
the rotation state detection device detects crankshaft rotational speed of the crankshaft as the parameter relating to the crankshaft rotation.

16. The bicycle control apparatus as recited in claim 14, wherein
the controller is programmed such that the prescribed range relating to the crankshaft torque is greater than or equal to 10 Nm and less than or equal to 50 Nm.

17. The bicycle control apparatus as recited in claim 15, wherein
the controller is programmed such that the prescribed range relating to the crankshaft rotational speed is greater than or equal to 30 rpm and less than or equal to 90 rpm.

18. The bicycle control apparatus as recited in claim 1, wherein
the controller is programmed to set or change the prescribed range in response to an input.

19. A bicycle control apparatus comprising:
a manual drive force detecting device that detects a manual drive force;
a rotation state detection device that detects a parameter relating to crankshaft rotation of a crankshaft;
an operation part; and
a controller programmed to control at least one of a driving unit that generates an auxiliary drive force and an electric transmission unit so that the manual drive force and the parameter relating to the crankshaft rotation will be within a prescribed range, the controller being further programmed to set or change the prescribed range based on at least one of the manual drive force detected by the manual drive force detecting device and the parameter relating to the crankshaft rotation detected by the rotation state detection device upon the operation part being operated during traveling.

20. The bicycle control apparatus as recited in claim 19, wherein
the manual drive force detecting device detects the manual drive force at a prescribed time interval during traveling, and
the controller is programmed to set or change the prescribed range according to a plurality of manual drive forces detected by the manual drive force detecting device or an average value of the plurality of manual drive forces.

21. The bicycle control apparatus as recited in claim 19, wherein
the rotation state detection device detects the parameter relating to the crankshaft rotation at a prescribed time interval during traveling, and
the controller is programmed to set or change the prescribed range according to a plurality of parameters relating to the crankshaft rotation detected by the rotation state detection device or an average value of the plurality of parameters relating to the crankshaft rotation.

22. The bicycle control apparatus as recited in claim 20, wherein
the plurality of manual drive forces detected by the manual drive force detecting device include at least a manual drive force detected by the manual drive force detecting device immediately before the operation part being operated.

23. The bicycle control apparatus as recited in claim 21, wherein
the plurality of parameters relating to the crankshaft rotation detected by the rotation state detection device include at least a parameter relating to the crankshaft rotation detected by the rotation state detection device immediately before the operation part being operated.

24. The bicycle control apparatus as recited in claim 20, wherein
the controller sets the prescribed range so that the average value of the plurality of manual drive forces is located at the center of the prescribed range.

25. The bicycle control apparatus as recited in claim 21, wherein
the controller is programmed to set the prescribed range so that the average value of the plurality of parameters relating to the crankshaft rotation is located at a center of the prescribed range.

26. The bicycle control apparatus as recited in claim 19, wherein
the controller is programmed to set the prescribed range based on at least one of the manual drive force detected by the manual drive force detecting device and the parameter relating to the crankshaft rotation detected by the rotation state detection device at a time of the operation part being operated during traveling.

27. The bicycle control apparatus as recited in claim 20, wherein
the plurality of manual drive forces detected by the manual drive force detecting device include at least a manual drive force detected by the manual drive force detecting device immediately after the operation part having been operated.

28. The bicycle control apparatus as recited in claim 21, wherein
the plurality of parameters relating to the crankshaft rotation detected by the rotation state detection device include at least a parameter relating to the crankshaft rotation detected by the rotation state detection device immediately after the operation part having been operated.

\* \* \* \* \*